(12) United States Patent
Furuta

(10) Patent No.: US 8,493,425 B2
(45) Date of Patent: Jul. 23, 2013

(54) IMAGE FORMING APPARATUS

(75) Inventor: Yasutomo Furuta, Abiko (JP)

(73) Assignee: Canon Kabushiki Kaisha (JP)

( * ) Notice: Subject to any disclaimer, the term of this patent is extended or adjusted under 35 U.S.C. 154(b) by 37 days.

(21) Appl. No.: 13/149,064

(22) Filed: May 31, 2011

(65) Prior Publication Data

US 2011/0298884 A1    Dec. 8, 2011

(30) Foreign Application Priority Data

Jun. 3, 2010 (JP) ................. 2010-127785
May 27, 2011 (JP) ................. 2011-119162

(51) Int. Cl.
*B41J 2/455* (2006.01)

(52) U.S. Cl.
USPC ....................................... 347/233

(58) Field of Classification Search
USPC ......... 347/236, 237, 243, 246, 247, 259–261, 347/229, 231, 233
See application file for complete search history.

(56) References Cited

U.S. PATENT DOCUMENTS 4,763,134 A * 8/1988 Murahashi et al. ........... 347/247
7,499,072 B2 * 3/2009 Izumiya et al. ............... 347/249

FOREIGN PATENT DOCUMENTS

JP    2004-025841 A    1/2001

* cited by examiner

*Primary Examiner* — Hai C Pham
(74) *Attorney, Agent, or Firm* — Rossi, Kimms & McDowell LLP

(57) ABSTRACT

An image forming apparatus capable of reducing density variation that occurs in an output image when the rotational speed of a polygon mirror is changed. A light source emits a light beam for forming an electrostatic latent image on a photosensitive drum. The polygon mirror deflects the light beam such that the light beam moves on the photosensitive drum in a predetermined direction. A polygon mirror control circuit controls the polygon mirror such that when the toner image is to be formed at a first magnification, the rotational speed of the polygon mirror is made higher than when the toner image is to be formed at a second magnification that is larger than the first magnification. When the toner image is to be formed at the first magnification, the light beam becomes smaller in light amount than when the toner image is to be formed at the second magnification.

4 Claims, 24 Drawing Sheets

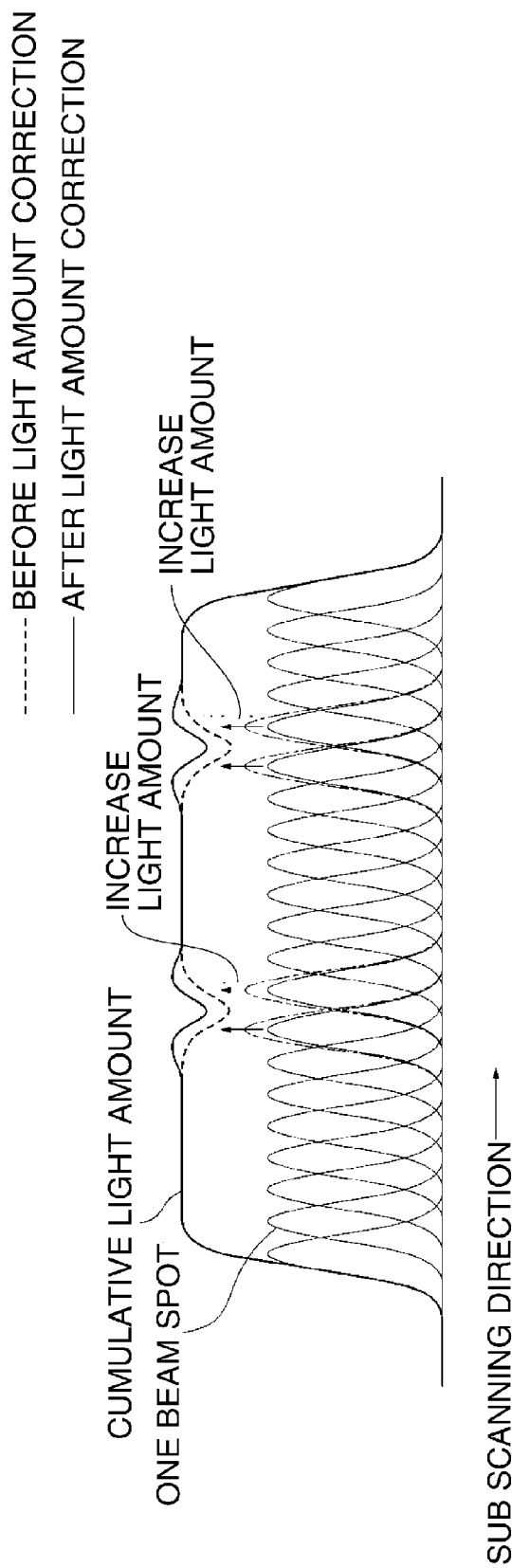

FIG.22A
RELATED ART
FIG.22B
RELATED ART
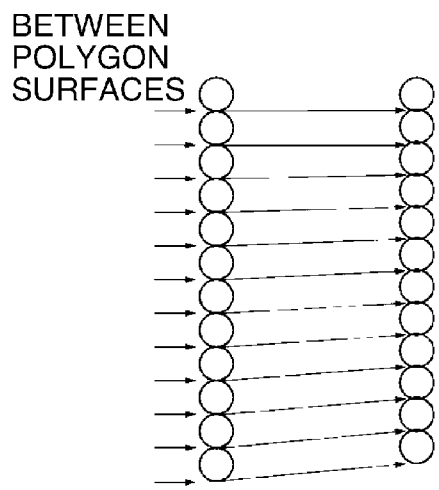
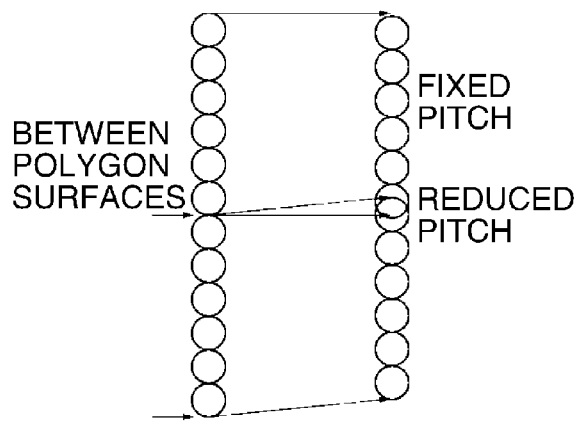

IMAGE FORMING APPARATUS

BACKGROUND OF THE INVENTION

1. Field of the Invention

The present invention relates to an image forming apparatus that forms images by exposing a photosensitive member.

2. Description of the Related Art

There has generally been known an image forming apparatus, such as a copying machine or a printer, which performs image formation using the electrophotographic process. In recent years, it has been demanded that an image forming apparatus of this type forms high-quality images on a plurality of types of recording sheets (transfer sheets) at a high speed with high accuracy.

An image forming apparatus using the electrophotographic process is provided with an exposure device that emits a light beam (e.g. a laser beam), and exposes a photosensitive member by the laser beam emitted from the exposure device to thereby form an electrostatic latent image on the photosensitive member. The laser beam is deflected by a rotary polygon mirror (hereinafter simply referred to as "the polygon mirror") driven by a drive motor (hereinafter referred to as "the scanner motor"). When the laser beam is deflected by the polygon mirror, the spot formed by the laser beam is shifted on the photosensitive member in a predetermined direction. The photosensitive member is thus exposed by the deflected laser beam, whereby the electrostatic latent image is formed on the photosensitive member. The electrostatic latent image formed on the photosensitive member is visualized by toner as a toner image, and the toner image is transferred onto a recording medium. The toner image on the recording medium is heated by a fixing device whereby the toner is fixed on the recording medium.

When the toner image is heated and fixed on the recording medium, water contained in the recording medium is evaporated. When the amount of the water contained in the recording medium is reduced, the size of the recording medium is also reduced. In a case where double-sided printing is performed, an image on the front side of a recording medium is fixed, and then image formation is performed on the reverse side of the recording medium. Therefore, a difference in image size occurs between the front and reverse surfaces of the recording medium. Further, when humidity in an environment where a recording medium is placed rises, the amount of water contained in the recording medium increases, and hence the size of the recording medium also increases. For this reason, a problem occurs that an image formed in a high-humidity state and an image formed in a low-humidity state differ from each other in size with respect to the size of a recording medium.

Recently, in order to achieve high image quality, it has been demanded that an image forming apparatus is capable of aligning an image forming position on a recording medium with high accuracy (e.g. improvement of accuracy in positioning an image on a recording medium, and reduction of color shift that occurs in superimposition of a plurality of colors in a color image forming apparatus).

To meet the demand, e.g. before forming an image on the reverse side of the recording medium, image magnification is corrected according to expansion/contraction of an image formed on the front side of a recording medium such that an image size on the reverse side of the recording medium coincides with an image size on the front side of the same (see Japanese Patent Laid-Open Publication No. 2004-25841). In an image forming apparatus disclosed in Japanese Patent Laid-Open Publication No. 2004-25841, the rotational speed of a scanner motor is controlled, whereby the rotational speed of a polygon mirror is controlled. By changing the rotational speed of the polygon mirror, the magnification of the image in the sub scanning direction (i.e. the direction of rotation of a photosensitive member) is changed, whereby image shift is corrected. In double-sided printing, image magnification is adjusted (corrected), as mentioned above, whereby the image sizes of respective front-side and reverse-side output images are made equal to each other.

However, when an electrostatic latent image is formed on the photosensitive member by the method disclosed in Japanese Patent Laid-Open Publication No. 2004-25841, there arises the following problem.

FIGS. 22A and 22B are views illustrating pitch intervals in the sub scanning direction between scanning spots (exposure spots) before and after changing of the rotational speed of a polygon mirror of a conventional image forming apparatus. FIG. 22A illustrates scanning spot intervals in an apparatus in which the photosensitive member is exposed by a laser beam (single beam) emitted from a single light source provided in the exposure device. FIG. 22B illustrates scanning spot intervals in an apparatus in which the photosensitive member is exposed by a plurality of laser beams (multi-beams) emitted from a plurality of light sources provided in the exposure device.

When the rotational speed of the polygon mirror is increased in the apparatus in which the photosensitive member is exposed by a single beam (see FIG. 22A), so as to correct image magnification in the sub scanning direction, space intervals between scanning lines formed on the photosensitive member are uniformly reduced. Therefore, as the rotational speed of the polygon mirror is increased, image density is also increased. Thus, a difference in density is caused between a front-side image and a reverse-side image when forming images on the front and reverse sides of the recording medium using the same image data.

On the other hand, when the rotational speed of the polygon mirror is increased in the apparatus in which the photosensitive member is exposed by a plurality of beams (multi-beams) (see FIG. 22B), so as to correct image magnification in the sub scanning direction, a space interval between a last scanning line formed on the photosensitive member in one scan and a first scanning line formed on the photosensitive member in the next scan (the space interval will be hereinafter referred to as "the scan-to-scan line interval") becomes different from the space interval between scanning lines formed on the photosensitive member in the single scan. In short, whenever the rotational speed of the polygon mirror is changed, the scan-to-scan interval is reduced or increased according to the rotational speed of the polygon mirror. Thus, the space intervals between scanning lines formed on the photosensitive member become non-uniform due to change in the rotational speed of the polygon mirror. More specifically, the reduced magnification makes some scanning line interval narrower, and the increased magnification makes some scanning line interval wider. This causes variation in output image density.

Thus, when the rotational speed of the polygon mirror is changed, the quality of an image formed on the recording medium is degraded.

SUMMARY OF THE INVENTION

The present invention provides an image forming apparatus which performs image formation by exposing a photosensitive member using light beams and is capable of reducing degradation of image quality that occurs when the rotational speed of a polygon mirror or a photosensitive member is changed.

In a first aspect of the present invention, there is provided an image forming apparatus that develops an electrostatic latent image formed on a photosensitive member being rotating, using toner, to thereby form a toner image, comprising a light source configured to emit a light beam for forming the electrostatic latent image on the photosensitive member, a rotary polygon mirror configured to deflect the light beam such that the light beam moves on the photosensitive member in a predetermined direction, a speed control unit configured to control a rotational speed of the rotary polygon mirror to form the toner image at a first magnification or at a second magnification which is larger than the first magnification, such that the rotational speed of the rotary polygon mirror for forming the toner at the first magnification is higher than the rotational speed of the rotary polygon mirror for forming the toner at the second magnification, and a light source control unit configured to control the light source such that a light amount of the light beam for forming the toner at the first magnification becomes smaller than the light amount of the light beam for forming the toner at the second magnification.

In a second aspect of the present invention, there is provided an image forming apparatus that develops an electrostatic latent image formed on a photosensitive member being rotating, using toner, to thereby form a toner image, comprising a light source configured to emit a light beam for forming the electrostatic latent image on the photosensitive member, a rotary polygon mirror configured to deflect the light beam such that the light beam moves on the photosensitive member in a predetermined direction, and a light source control unit configured to control the light source, wherein the light source comprises a plurality of light emitting points for emitting light beams, the light emitting points being arranged such that the light beams emitted from the light emitting points and deflected by the rotary polygon mirror are irradiated onto respective different positions on the photosensitive member in a direction of rotation of the photosensitive member, and wherein the light source control unit controls the light source such that a light amount of either or both of outermost beams of the light beams, at respective opposite ends in the direction of rotation of the photosensitive member, in a case where the rotary polygon mirror is rotating at a first speed, becomes smaller than the light amount of either or both of the outermost beams of the light beams, in a case where the rotary polygon mirror is rotating at a second speed that is lower than the first speed.

In a third aspect of the present invention, there is provided an image forming apparatus that develops an electrostatic latent image formed on a photosensitive member being rotating, using toner, to thereby form a toner image, comprising a light source configured to emit a light beam for forming the electrostatic latent image on the photosensitive member, a speed control unit configured to control a rotational speed of the photosensitive member to form the toner image at a first magnification or at a second magnification which is larger than the first magnification, such that when the toner image is to be formed at the first magnification, the rotational speed of the photosensitive member is made higher than when the toner image is to be formed at the second magnification, and a light source control unit configured to control the light source such that a light amount of the light beam for forming the toner at the first magnification becomes smaller than the light amount of the light beam for forming the toner at the second magnification.

In a fourth aspect of the present invention, there is provided an image forming apparatus that develops an electrostatic latent image formed on a photosensitive member driven for rotation, using toner, to thereby form a toner image, comprising a light source configured to emit a light beam for forming the electrostatic latent image on the photosensitive member, a rotary polygon mirror configured to deflect the light beam such that the light beam moves on the photosensitive member in a predetermined direction, a speed control unit configured to be operable when the toner image is to be formed at a first magnification or at a second magnification which is larger than the first magnification, to control a rotational speed of the photosensitive member to a first speed to form the toner image at the first magnification, and control the rotational speed of the photosensitive member to a second speed which is lower than the first speed, to form the toner image at the second magnification, and a light source control unit configured to control the light source, wherein the light source comprises a plurality of light emitting points for emitting light beams, the light emitting points being arranged such that the light beams emitted from the light emitting points and deflected by the rotary polygon mirror are irradiated onto respective different positions on the photosensitive member in a direction of rotation of the photosensitive member, and wherein the light source control unit controls the light source such that a light amount of either or both of outermost beams of the light beams, at respective opposite ends in the direction of rotation of the photosensitive member, in a case where the photosensitive member is controlled to the first speed, becomes smaller than the light amount of either or both of the outermost beams of the light beams, in a case where the photosensitive member is controlled to the second speed.

The features and advantages of the invention will become more apparent from the following detailed description taken in conjunction with the accompanying drawings.

BRIEF DESCRIPTION OF THE DRAWINGS

FIG. 11 is a diagram illustrating light amount distributions on the photosensitive member, which are obtained, respectively, before and after execution of the image size correction in FIG. 10.

FIGS. 21A, 21B, and 21C are diagrams illustrating examples of results obtained by FFT processing executed by an image processing unit appearing in FIG. 20, in which FIG. 21A shows an example of a result obtained by the FFT processing when a spatial frequency is not higher than a predetermined threshold value; FIG. 21B shows an example of a result obtained by the FFT processing when the spatial frequency is higher than the predetermined threshold value; and FIG. 21C shows a result obtained by setting a plurality of threshold values.

FIG. 22A is a view illustrating pitch intervals in the sub scanning direction between scanning spots (exposure spots) formed by single-beam scanning before and after changing of the rotational speed of a polygon mirror in the conventional image forming apparatus.

FIG. 22B is a view illustrating pitch intervals in the sub scanning direction between scanning spots (exposure spots) formed by multi-beam scanning before and after changing of the rotational speed of the polygon mirror in the conventional image forming apparatus.

DETAILED DESCRIPTION OF THE EMBODIMENTS

The present invention will now be described in detail below with reference to the accompanying drawings showing embodiments thereof.

Figure 1:
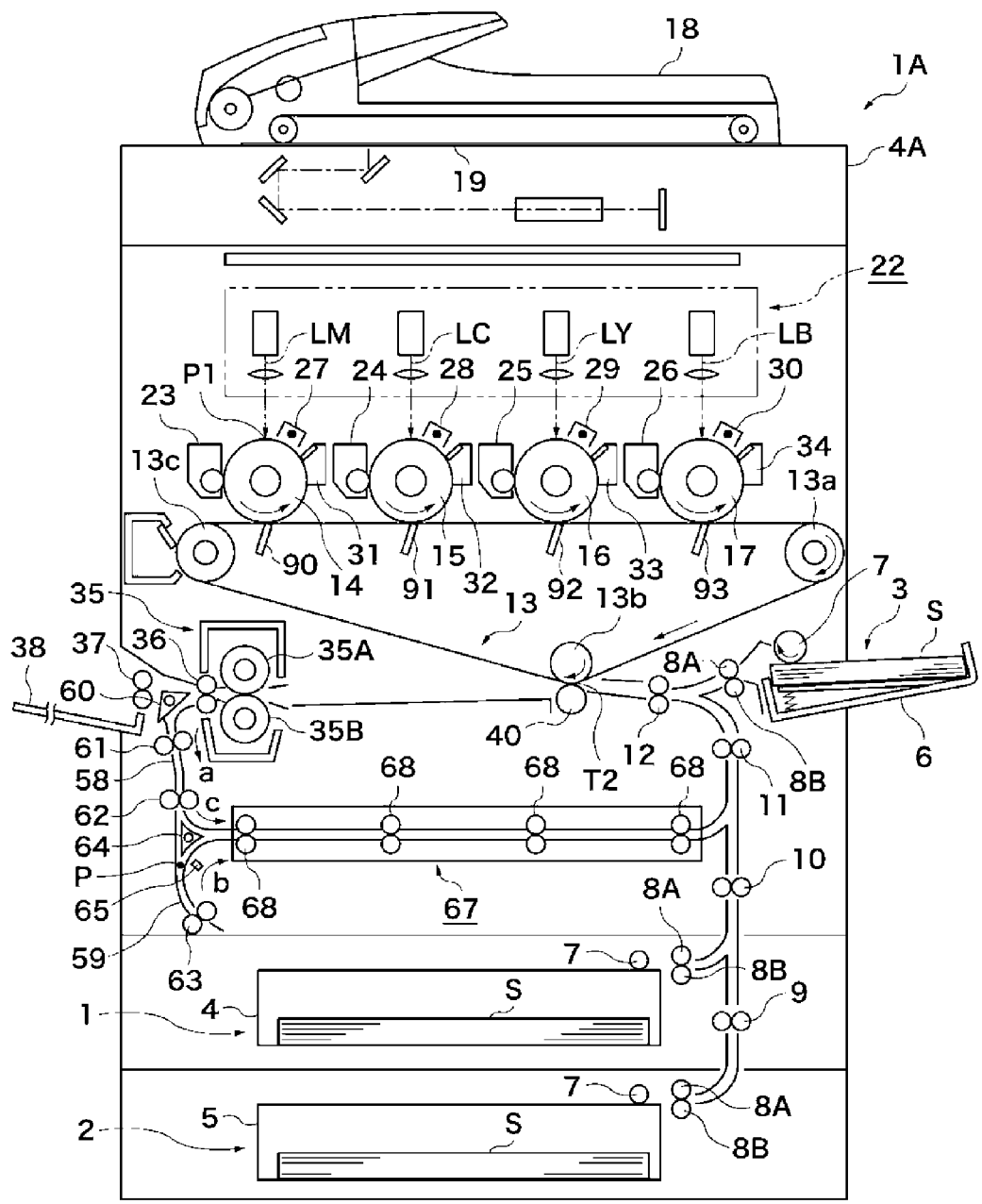
FIG. 1 is a schematic longitudinal cross-sectional view of an image forming apparatus according to a first embodiment of the present invention.

FIG. 1 is a schematic longitudinal cross-sectional view of an image forming apparatus according to a first embodiment of the present invention. Note that the image forming apparatus 1A shown in FIG. 1 is a color image forming apparatus that forms a color image by superimposing four colors of cyan (C), magenta (M), yellow (Y), and black (K) one upon another.

The image forming apparatus 1A has four photosensitive drums (photosensitive members) 14, 15, 16, and 17. Each of the photosensitive drums 14, 15, 16, and 17 has a surface functioning as an exposed surface. An intermediate transfer belt (endless belt) 13 as an intermediate transfer member is disposed in facing relation to the photosensitive drums 14, 15, 16, and 17. The intermediate transfer belt 13 is stretched around a driving roller 13a, a secondary transfer opposed roller 13b, and a tension roller (driven roller) 13c such that the general shape of the intermediate transfer belt 13 in cross-sectional view is triangular. The intermediate transfer belt 13 rotates in a clockwise direction as viewed in FIG. 1 (i.e. in a direction indicated by a solid-line arrow in FIG. 1).

The photosensitive drums 14, 15, 16, and 17 are arranged in the direction of rotation of the intermediate transfer belt 13. In the example shown in FIG. 1, the photosensitive drums 14, 15, 16, and 17 are arranged in the mentioned order from the most upstream side of the rotation of the intermediate transfer belt 13. Around the photosensitive drum 14, there are arranged an electrostatic charger 27, a developing device 23, and a cleaner 31. Similarly, arranged around each of the photosensitive drums 15, 16, and 17 are an associated one of electrostatic chargers 28, 29, and 30, an associated one of developing devices 24, 25, and 26, and an associated one of cleaners 32, 33, and 34.

The electrostatic chargers 27, 28, 29, and 30 uniformly charge the surfaces of the photosensitive drums 14, 15, 16, and 17, respectively. An exposure controller (hereinafter also referred to as "the exposure control section") 22 is disposed above the photosensitive drums 14, 15, 16, and 17 and scans the surfaces of the respective photosensitive drums 14, 15, 16, and 17 by laser beams (light beams), described hereinafter. Note that in the example shown in FIG. 1, the photosensitive drums 14, 15, 16, and 17 correspond to magenta (M) toner, cyan (C) toner, yellow (Y) toner, and black (K) toner, respectively.

Now, a description will be given of an image forming (printing) operation performed by the image forming apparatus 1A shown in FIG. 1. The image forming apparatus 1A shown in FIG. 1 has two cassette sheet feeders 1 and 2 and a manual sheet feeder 3. Recording sheets (transfer sheets) S are selectively fed from the cassette sheet feeders 1 and 2 and the manual sheet feeder 3. The cassette sheet feeders 1 and 2 have respective cassettes 4 and 5, and the manual sheet feeder 3 has a tray 6. Transfer sheets S are stacked on each of the cassette 4 or 5 and the tray 6, and are picked up sequentially from an uppermost one by an associated pickup roller 7. Then, only the uppermost transfer sheet S is separated from the other picked-up sheets S by a separation roller pair 8 formed by a feed roller 8A and a retard roller 8B.

A transfer sheet S fed from the cassette sheet feeder 1 or 2 is conveyed to a registration roller pair 12 via a conveying roller pair 9 and/or a conveying roller pair 10, and a conveying roller pair 11. On the other hand, a transfer sheet S fed from the manual sheet feeder 3 is immediately conveyed to the registration roller pair 12. Then, the conveyance of the transfer sheet S is temporarily stopped by the registration roller pair 12, and skew of the transfer sheet S is corrected.

The image forming apparatus 1A is provided with an original feeder 18, and the original feeder 18 sequentially feeds originals stacked thereon, one by one, onto an original platen glass 19. When an original is conveyed to a predetermined position on the original platen glass 19, a scanner unit 4A illuminates the surface of the original, and reflected light from the original is guided to a lens (not shown) via mirrors and so forth (not shown). Then, the reflected light forms an optical image on an image sensor unit (not shown).

The image sensor unit photoelectrically converts the formed optical image to an electric signal. The electric signal is input to an image processing section (hereinafter also referred to as "the image processing unit"; not shown in FIG. 1). The image processing section converts the electric signal to a digital signal and then performs required image processing on the digital signal to thereby generate image data. The image data is input to the exposure controller 22 directly or after having been temporarily stored in an image memory (not shown). The exposure controller 22 drives semiconductor lasers, described hereinafter, according to the image data. Thus, laser beams (light beams) are emitted from the semiconductor lasers.

Each of the laser beams is irradiated onto the surface of an associated one of the photosensitive drums 14, 15, 16, and 17 via a scanning system including a rotary polygon mirror (hereinafter simply referred to as "the polygon mirror") described hereinafter. The laser beam is deflected by the polygon mirror to scan the surface of the associated one of the photosensitive drums 14, 15, 16, and 17 in the main scanning direction (i.e. along the rotational axis of each of the photosensitive drums 14, 15, 16, and 17). Each of the photosensitive drums 14, 15, 16, and 17 rotates in a direction (sub scanning direction) indicated by a solid-line arrow in FIG. 1, so that the photosensitive drums 14, 15, 16, and 17 are each scanned in the sub scanning direction as well by the laser beams. Electrostatic latent images are formed on the respective photosensitive drums 14, 15, 16, and 17 according to the image data by the scanning of the laser beams.

In the example shown in FIG. 1, first, the most upstream photosensitive drum 14 is exposed by a laser beam LM based on a magenta component of the image data. As a consequence, an electrostatic latent image is formed on the photosensitive drum 14. Then, the electrostatic latent image on the photosensitive drum 14 is developed by the developing device 23 into a magenta (M) toner image. Then, when a predetermined time period has elapsed after the start of the exposure of the photosensitive drum 14, the photosensitive drum 15 is exposed by a laser beam LC based on a cyan component of the image data. As a consequence, an electrostatic latent image is formed on the photosensitive drum 15. The electrostatic latent image on the photosensitive drum 15 is developed by the developing device 24 into a cyan (C) toner image.

Further, when the predetermined time period has elapsed after the start of the exposure of the photosensitive drum 15, the photosensitive drum 16 is exposed by a laser beam LY based on a yellow component of image data. As a consequence, an electrostatic latent image is formed on the photosensitive drum 16. The electrostatic latent image on the photosensitive drum 16 is developed by the developing device 25 into a yellow (Y) toner image. Then, when the predetermined time period has elapsed after the start of the exposure of the photosensitive drum 16, the photosensitive drum 17 is exposed by a laser beam LB based on a black component of image data. As a consequence, an electrostatic latent image is formed on the photosensitive drum 17. The electrostatic latent image on the photosensitive drum 17 is developed by the developing device 26 into a black (K) toner image.

The M toner image on the photosensitive drum 14 is transferred onto the intermediate transfer belt 13 by a transfer charger 90. Similarly, the C toner image, the Y toner image, and the K toner image are transferred from the photosensitive drums 15, 16, and 17 onto the intermediate transfer belt 13 by transfer chargers 91, 92, and 93, respectively. As a consequence, the M toner image, the C toner image, the Y toner image, and the K toner image are transferred onto the intermediate transfer belt 13 in superimposed relation, whereby a color toner image is formed as a primary transfer image on the intermediate transfer belt 13. Note that toners remaining on the respective photosensitive drums 14, 15, 16, and 17 after the transfer of the toner images are cleaned by the cleaners 31, 32, 33, and 34, respectively.

The transfer sheet S temporarily stopped at the registration roller pair 12 is conveyed to a secondary transfer position T2 by the registration roller pair 12 being driven. At this time, the registration roller pair 12 is driven for rotation in timing synchronous with alignment between the color toner image on the intermediate transfer belt 13 and the leading edge of the transfer sheet S, whereby the transfer sheet S is conveyed to the secondary transfer position T2. At the secondary transfer position T2, there are disposed a secondary transfer roller 40 and the secondary transfer opposed roller 13b, and the color toner image on the intermediate transfer belt 13 is transferred as a secondary transfer image onto the transfer sheet S at the secondary transfer position T2.

The transfer sheet S having passed through the secondary transfer position T2 is conveyed to a fixing device 35. The fixing device 35 has a fixing roller 35A and a pressure roller 35B. The transfer sheet S is heated by the fixing roller 35A and pressed by the pressure roller 35B during passage through a nip formed by the fixing roller 35A and the pressure roller 35B. As a consequence, the secondary transfer image is fixed on the transfer sheet S. The transfer sheet S having undergone the fixing processing is conveyed to a discharge roller pair 37 by a conveying roller pair 36 and is discharged onto a discharge tray 38 by the discharge roller pair 37. This completes single-sided printing.

The image forming apparatus 1A shown in FIG. 1 is capable of performing image formation in the so-called double-sided printing mode. More specifically, the image forming apparatus 1A has a double-sided printing function, and the double-sided printing function is used in the double-sided printing mode.

In the double-sided printing mode, a transfer sheet S having undergone the fixing processing through the fixing device 35 is conveyed into an inversion path 59 via a vertical path 58. At this time, a flapper 60 is in a state keeping the vertical path 58 open, so that the transfer sheet S having undergone the fixing processing is conveyed into the inversion path 59 by the conveying roller pair 36, conveying roller pairs 61 and 62, and a reverse rotation roller pair 63. At a time point when the trailing edge of the transfer sheet S having undergone the fixing processing and being conveyed in a direction indicated by an arrow "a" passes a point P, the reverse rotation roller pair 63 is driven for reverse rotation, whereby the transfer sheet S having undergone the fixing processing is conveyed in a direction indicated by an arrow "b", with its trailing edge in the leading position. As a consequence, the surface of the transfer sheet S having undergone the fixing processing, on which the secondary transfer image has been formed, is caused to face upward. Note that at the point P, there is disposed a flapper 64 provided with a flexible transfer sheet. The flapper 64 makes it possible for the transfer sheet S to enter the inversion path 59 from the vertical path 58 but impossible for the transfer sheet S to enter the vertical path 58 from the inversion path 59. Further, at the point P, there is disposed a detection lever 65. The detection lever 65 detects that the trailing edge of the transfer sheet S has passed the point P.

The transfer sheet S having undergone the fixing processing and conveyed in the direction indicated by the arrow "b" by reverse rotation of the reverse rotation roller pair 63, as described above, is conveyed into a re-feeding path 67. Then, the transfer sheet S having undergone the fixing processing is conveyed to the registration roller pair 12 again via a plurality of conveying roller pairs 68 in the re-feeding path and the conveying roller pair 11. The transfer sheet S having undergone the fixing processing has its skew corrected by the registration roller pair 12, and is then conveyed to the secondary transfer position T2. Then, second-time image formation is performed on the transfer sheet S based on image data subjected to magnification correction in the main and sub scanning directions, and the transfer sheet S is discharged onto the discharge tray 38 through the same process as for single-sided image formation described hereinbefore.

Figure 2:
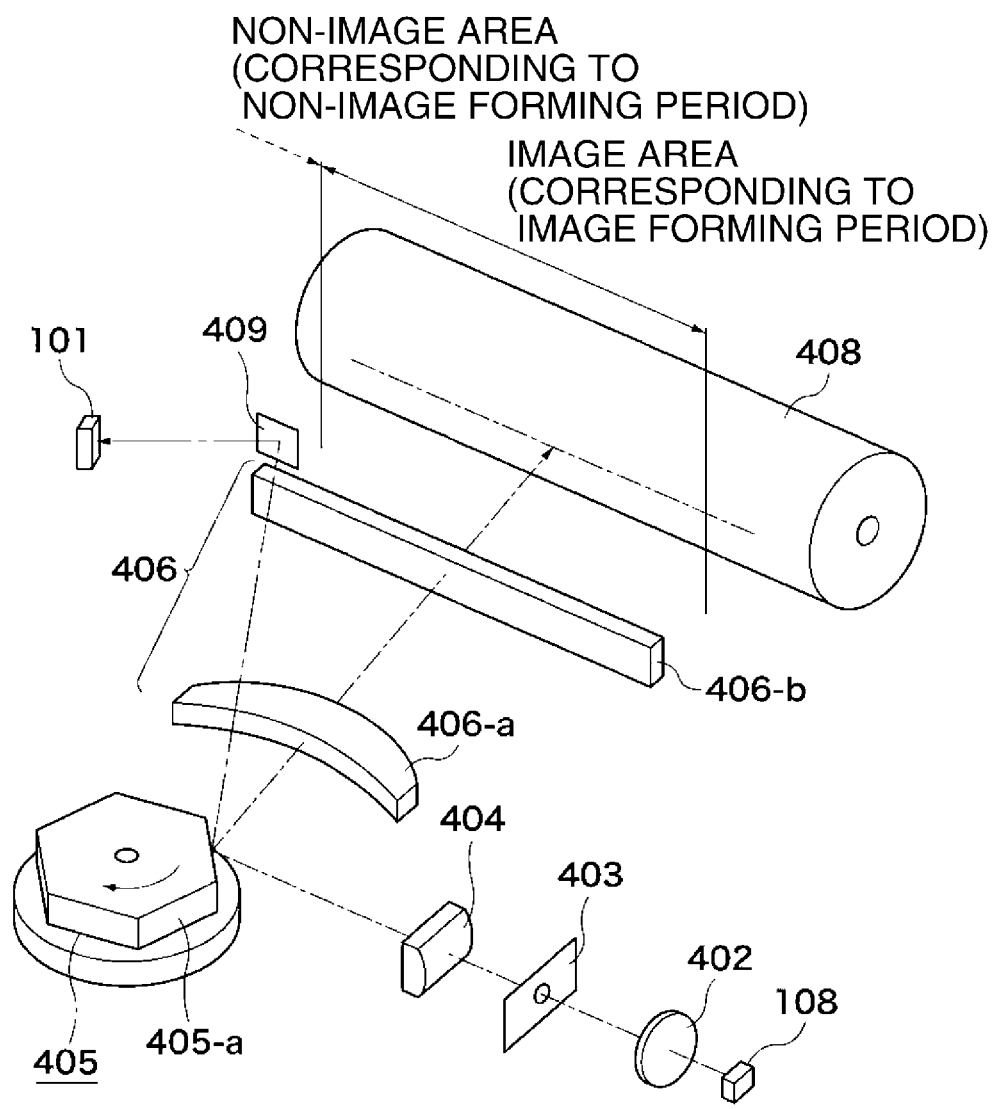
FIG. 2 is a perspective view of an optical system used in an exposure control section appearing in FIG. 1.

FIG. 2 is a perspective view of the optical system used in the exposure control section 22 appearing in FIG. 1. In the following description, "a space interval between scanning lines formed on a photosensitive drum (photosensitive member)" is equivalent to "a pitch interval between laser beams". The pitch interval between laser beams (i.e. the space interval between scanning lines formed on a photosensitive drum) corresponds to a space interval in the sub scanning direction (direction of rotation of the photosensitive drum) between laser beams for scanning the same surface (identical reflective surface: identical polygon surface) of a polygon mirror. Further, "a scan-to-scan line interval" means "a space interval between the last scanning line in one scan and the first scanning line in the following scan", and the scan-to-scan line interval is equivalent to a pitch interval between polygon surfaces. The pitch interval between polygon surfaces corresponds to a space interval in the sub scanning direction between a laser beam scanned by one reflective surface of a polygon mirror and a laser beam scanned by the following reflective surface of the polygon mirror.

Referring to FIG. 2, in the illustrated example, only the optical system associated with one photosensitive drum is shown for convenience of description. In FIG. 2, the photosensitive drum is denoted by reference numeral 408. The exposure control section 22 has a semiconductor laser 108, and the semiconductor laser 108 comprises a plurality of laser elements (light sources) (not shown). Each of the laser elements is driven by a drive current applied thereto, and outputs a laser beam (light beam) corresponding to the drive current. Therefore, as described hereinafter, the exposure control section 22 is capable of forming a plurality of scanning lines in the direction of rotation of the photosensitive drum by scanning a plurality of laser beams simultaneously by the polygon mirror.

The semiconductor laser 108 incorporates a photodiode (PD), not shown, described hereinafter. The drive current is controlled, based on the amount of light received by the photodiode, such that the laser elements are lighted individually and the light amount of a laser beam emitted from each of the laser elements becomes equal to a predetermined light amount. This point will be described hereinafter.

Each of the laser elements outputs divergent light as laser beams. Each of the laser beams enters the polygon mirror, denoted by reference numeral 405 in FIG. 2, via a collimator lens 402, an aperture stop 403, and a cylindrical lens 404. Then, the laser beams are reflected on a reflective surface (polygon surface) 405-a of the polygon mirror 405 and pass through a toric lens 406-a and a diffractive optical element 406-b, to form an image on the photosensitive drum 408.

The collimator lens 402 converts the laser beams emitted from the laser elements to a substantially parallel light flux. The aperture stop 403 restricts the light flux passing therethrough. The cylindrical lens 404 has a predetermined refractive power only in the sub scanning direction. The cylindrical lens 404 causes the laser beams having passed through the aperture stop 403 to form an image within a sub scanning cross section on the reflective surface 405-a of the polygon mirror 405. During the process, the polygon mirror 405 is being rotated by a drive source (not shown) such as a motor. The polygon mirror 405 deflects and scans the laser beams having formed the image on its reflective surface 405-a. The toric lens 406-a and the diffractive optical element 406-b form an optical element 406 having an f-θ characteristic. The optical element 406 comprises a refraction unit and a diffraction unit. The refraction unit is defined by the toric lens 406-a. The toric lens 406-a has different powers which act in the main scanning direction and in the sub scanning direction, respectively. The lens surface of the toric lens 406-a in the main scanning direction is formed to have a non-spherical shape. On the other hand, the diffraction unit is defined by the diffractive optical element 406-b. The diffractive optical element 406-b is elongated in shape, and has different powers which act in the main scanning direction and in the sub scanning direction, respectively. Note that a beam detection sensor (BD sensor) 101 is disposed in a beam scanning area (hereinafter referred to as "the non-image area") corresponding to a non-image forming period, referred to hereinafter, outside an image area corresponding to an image forming period, referred to hereinafter.

The laser beams deflected and scanned by the polygon mirror 405 are reflected on a reflecting mirror 409 and are irradiated onto the light receiving surface of the BD sensor 101. The BD sensor 101 detects the incident laser beams and outputs a BD detection signal. The timing of exposure of the photosensitive drum 408 is controlled according to beam detection timing in which the laser beams are detected, i.e. according to the BD detection signal. Note that detection of laser beams by the BD sensor 101 is performed based on any one of a plurality of laser beams. In the present embodiment, the laser beam for use in detection by the BD sensor 101 is set as a reference beam, and exposure timing is controlled by advancing or delaying time for exposure by the other laser beams by a predetermined time period with respect to exposure time associated with the reference beam.

Now, a description will be given of density variation that occurs in a conventional image forming apparatus, prior to description of exposure control performed by the image forming apparatus according to the present embodiment of the invention. FIGS. 22A and 22B are views illustrating pitch intervals in the sub scanning direction between scanning spots (exposure spots) before and after changing of the rotational speed of a polygon mirror in the conventional image forming apparatus. FIG. 22A illustrates a case of single-beam scanning, while FIG. 22B illustrates a case of multi-beam scanning.

Referring to FIGS. 22A and 22B, in a case where a photosensitive drum is exposed and scanned by a single beam (see FIG. 22A), when the rotational speed of a polygon mirror is increased, space intervals between scanning lines formed on the photosensitive drum are uniformly reduced, whereas when the rotational speed of the polygon mirror is reduced, space intervals between scanning lines formed on the photosensitive drum are uniformly increased. On the other hand, in a case where the photosensitive drum is scanned by a plurality of beams (multi-beams), when the rotational speed of the polygon mirror is changed (see FIG. 22B), a space interval between a last scanning line formed on the photosensitive drum in one scan and a first scanning line formed on the photosensitive drum in the next scan (the space interval will be hereinafter referred to as "the scan-to-scan line interval") becomes different from the space interval between scanning lines formed on the photosensitive drum in one scan. In short, whenever the rotational speed of the polygon mirror is changed, the scan-to-scan interval is reduced or increased according to the rotational speed of the polygon mirror. Thus, the space intervals between scanning lines formed on the photosensitive drum become non-uniform due to change in the rotational speed of the polygon mirror. More specifically, the reduced magnification makes some scanning line interval narrower, and the increased magnification makes some scanning line interval wider. This causes variation in the density of an output image.

Figure 23:
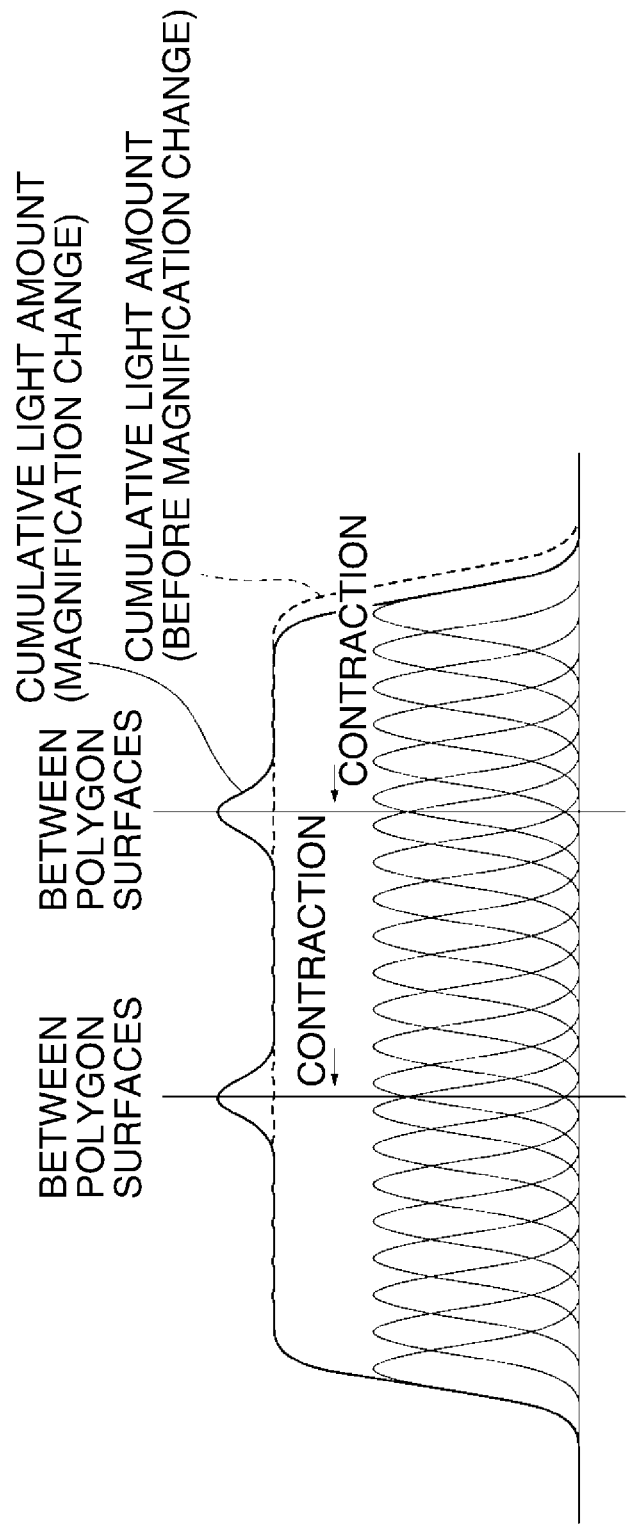
FIG. 23 is a diagram illustrating a light amount distribution on a photosensitive member, which is obtained when the rotational speed of the polygon mirror is changed in the conventional image forming apparatus so as to perform multi-beam exposure.

FIG. 23 is a diagram illustrating a cumulative light amount distribution on the photosensitive drum, which is obtained in a case where multi-beams are continuously emitted with the rotational speed of the polygon mirror controlled to a higher speed than the reference speed. This cumulative light amount distribution corresponds to a potential distribution on the photosensitive drum. As shown in FIG. 23, when the rotational speed of the polygon mirror is controlled to a higher speed than the reference speed, the cumulative light amount distribution becomes non-uniform. As a consequence, the density of an output image is locally changed, which causes density variation in the output image.

The image forming apparatus of the present embodiment is characterized in that density variation which occurs when the rotational speed of the polygon mirror is changed from the reference speed is reduced by adjusting the amount of light emitted from the semiconductor laser 108.

Figure 3A:
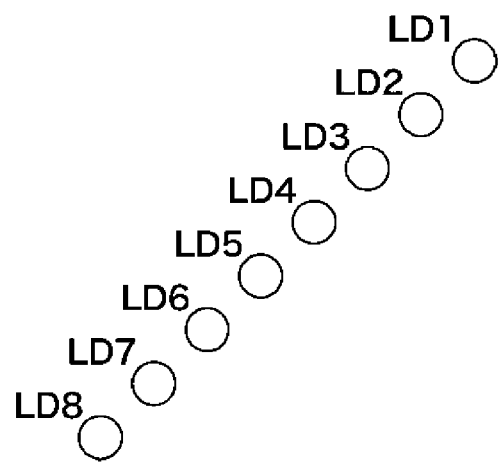
FIG. 3A is a view useful in explaining the arrangement of a semiconductor laser appearing in FIG. 2.

First, a description will be given of the arrangement of the semiconductor laser 108 used in the image forming apparatus of the present embodiment of the invention. FIG. 3A is a view useful in explaining an example of the arrangement of the semiconductor laser 108 appearing in FIG. 2.

Referring to FIG. 3A, the semiconductor laser 108 has eight laser elements (light sources) LD1 to LD8. The laser elements LD1 to LD8 are arranged in a predetermined direction on the same chip. FIG. 3A illustrates the positions (arrangement) of light emitting points of the respective laser elements LD1 to LD8 on the surface of the chip. The laser elements LD1 to LD8, i.e. the light emitting points are arranged in a line at equal space intervals (beam pitch intervals).

Figure 3B:
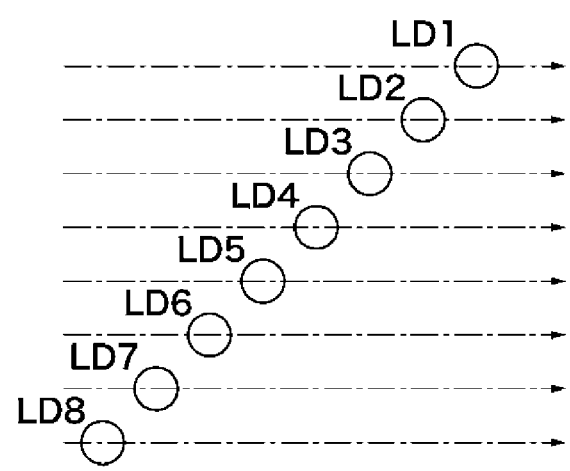
FIG. 3B is a view illustrating an example of locations of laser spots formed on a photosensitive drum appearing in FIG. 2.

FIG. 3B is a view illustrating an example of the arrangement of laser spots formed on the photosensitive drum 408 appearing in FIG. 2. Referring to FIG. 3B, the laser beams and the laser spots associated with the respective laser elements LD1 to LD8 are denotes by the same reference numerals as those of the laser elements. In the example shown in FIG. 3B, the photosensitive drum 408 is scanned and exposed by the eight laser beams LD1 to LD8 as described hereinbefore. The light emitting points are arranged in a line as described with reference to FIG. 3A, and the beam pitch intervals in the sub scanning direction of the photosensitive drum 408 are adjusted (more specifically, the space intervals between the scanning lines formed on the photosensitive drum 408 are adjusted) by the rotational speed of the polygon mirror 405 (see FIG. 2).

In the present example, the adjustment of the space interval between the scanning lines formed on the photosensitive drum 408 (also referred to as "the adjustment of the beam pitch intervals") is performed according to resolution of the image forming apparatus 1A (see FIG. 1). For example, when the resolution in the sub scanning direction is 600 dpi, four of the laser elements LD1 to LD8 are selectively lighted, as described hereinafter, whereby the scanning line intervals (beam pitch intervals) are adjusted e.g. to approximately 42 μm. Further, when the resolution in the sub scanning direction is 1200 dpi, the laser elements LD1 to LD8 are all lighted, as described hereinafter, to thereby form an image.

The laser beams are deflected by the polygon mirror 405, as described hereinbefore, whereby the photosensitive drum 408 is scanned in accordance with rotation of the polygon mirror 405. At this time, the laser beams scan the photosensitive drum 408 in one scan in a state (positional relationship) held at predetermined space intervals as shown in FIG. 3B.

Figure 4:
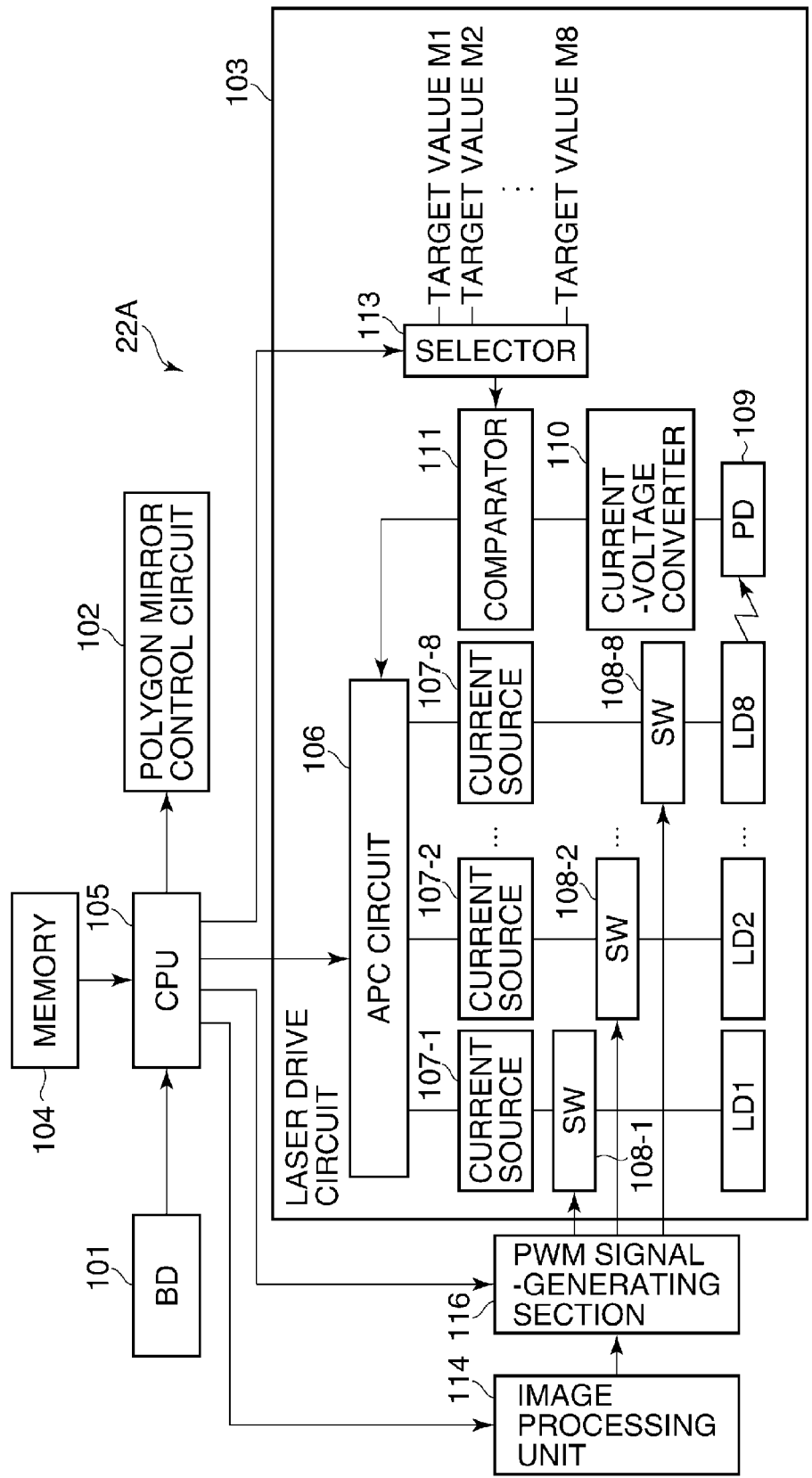
FIG. 4 is a block diagram of a controller used in the exposure control section appearing in FIG. 1.

FIG. 4 is a block diagram useful in explaining an example of a controller 22A used in the exposure control section 22 appearing in FIG. 1. The controller 22A includes a memory 104 and a CPU (central processing unit: light amount setting unit) 105. The CPU 105 controls elements described below, according to control programs stored e.g. in the memory 104. Further, the controller 22A includes an image processing unit 114, a PWM (pulse width modulation) signal-generating section 116, a laser drive circuit 103, and a polygon mirror control circuit (rotational speed control unit) 102.

The CPU 105 instructs the image processing unit 114 to perform predetermined image processing on input image data. The image processing unit 114 performs the predetermined image processing on the input image data based on the instruction from the CPU 105, and outputs the processed image data to the PWM signal-generating section 116.

The CPU 105 instructs the PWM signal-generating section 116 to generate a PWM signal for turning on or off switches SW108-1 to SW108-8, based on the image data received from the image processing unit 114. The CPU 105 receives a BD detection signal generated by the BD sensor 101. The CPU 105 controls timing for outputting the PWM signal to the switches SW108-1 to SW108-8, based on timing in which the BD sensor 101 generates the BD detection signal.

The laser elements LD1 to LD8 are connected to current sources 107-1 to 107-8 via the respective switches SW108-1 to SW108-8. When the switches SW108-1 to SW108-8 are turned on, drive currents are supplied to the laser elements LD1 to LD8 from the respective current sources 107-1 to 107-8.

Further, the CPU 105 instructs the polygon mirror control circuit 102 to control the rotational speed of the polygon mirror such that the repetition period of generation of the BD detection signal becomes a repetition period dependent on image magnification. The polygon mirror control circuit 102 drivingly controls a polygon motor (not shown) based on the instruction from the CPU 105 to thereby adjust the rotational speed of the polygon mirror 405. In the case of forming an image on the front side of a transfer material at a second magnification larger than a first magnification, the image forming apparatus of the present embodiment rotates the polygon mirror at a reference speed (second speed) corresponding to the second magnification. At this time, the polygon mirror control circuit 102 controls the rotational speed of the polygon mirror 402 such that the repetition period of generation of the BD detection signal becomes equal to a repetition period (second repetition period) corresponding to the reference speed. Further, in the case of forming an image on the reverse side of the transfer material at the first magnification, the polygon mirror control circuit 102 controls the rotational speed of the polygon mirror 405 to a first speed (corresponding to the first magnification) which is higher than the reference speed. At this time, the polygon mirror control circuit 102 controls the rotational speed of the polygon mirror 402 such that the repetition period of generation of the BD detection signal becomes equal to a first repetition period shorter than the second repetition period corresponding to the reference speed, to thereby make the size of the image formed on the reverse side of the transfer material smaller than that of the image formed on the front side of a transfer material.

Note that although in the above description, the second speed corresponding to the second magnification is set as the reference speed, the reference speed may be the first speed. In other words, one of a plurality of image magnifications may be a reference magnification. For example, an image magnification to be used in the case of forming an image on the front side of an ordinary paper sheet or a special sheet may be set as a reference magnification (100%), and an image magnification to be used in the case of forming an image on the reverse side of the ordinary paper sheet may be increased or reduced with respect to the reference magnification. The polygon mirror control circuit 102 controls the rotational speed of the polygon mirror 405 according to the magnification of an image to be formed.

Figure 5:
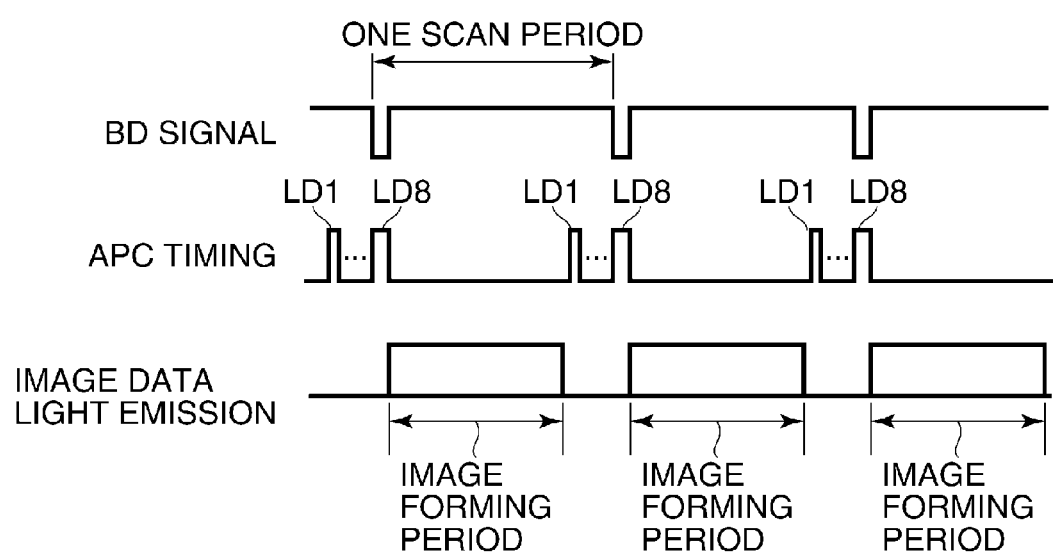
FIG. 5 is a diagram useful in explaining lighting timing for lighting laser elements appearing in FIG. 4.

Next, a description will be given of control of drive currents to be supplied to the laser elements LD1 to LD8. The CPU 105 operates an automatic power control (APC) circuit 106 in synchronism with the BD detection signal and controls the light amounts of laser beams to be emitted from the respective laser elements LD1 to LD8 according to the PWM signal. In the present embodiment, the CPU 105 executes automatic power control during a non-image forming period. As shown in FIG. 5, one repetition period of the BD detection signal includes a non-image forming period and an image forming period. The image forming period is a time period for forming an electrostatic latent image on the photosensitive drum based on image data, while the non-image forming period is a time period except the image forming period in the single repetition period. In the image forming period, drive currents are supplied from the current sources 107-1 to 107-8 to the respective laser elements LD1 to LD8, whereby the laser elements LD1 to LD8 emit light.

The CPU 105 controls the PWM signal-generating section 116 to generate a PWM signal for causing the laser elements LD1 to LD8 to emit light in different timing in the non-image forming period in synchronism with the BD detection signal. The switches SW108-1 to SW108-8 turn on in different timing according to the PWM signal from the PWM signal-generating section 116, and a laser element associated with a switch in its ON state emits light. The photodiode, denoted by 109 in FIG. 4, receives a laser beam from each of the laser elements LD1 to LD8.

Note that the photodiode 109 appearing in FIG. 4 is provided to detect the light amounts of laser beams emitted from the respective laser elements LD1 to LD8. For example, the photodiode 109 is incorporated in the semiconductor laser 108 to receive a laser beam emitted in a direction opposite to a direction of advance of a laser beam toward the photosensitive drum 408. In a case where a vertical cavity surface emitting laser is employed, a half mirror is disposed on an optical path of the laser beam that advances toward the photosensitive drum 408. The photodiode 109 is disposed in a position for receiving part of each laser beam reflected by the half mirror. The photodiode 109 delivers a light amount detection signal indicative of an electric current value corresponding to the light amount of the received laser beam to a current-voltage converter 110.

On the other hand, the light amount detection signal generated by detecting a laser beam from each of the laser elements LD1 to LD8 is converted to a voltage signal (hereinafter also referred to as "the detected light amount voltage value") by the current-voltage converter 110, and the voltage signal is delivered to a comparator 111. A selector 113 is connected to the comparator 111. The selector 113 includes a memory, not shown, and the memory stores target values M1 to M8. Each of the target values M1 to M8 is a voltage value indicative of a target value of the light amount associated with an associated one of the laser elements LD1 to LD8. The selector 113 selects the target values M1 to M8 in association with the respective laser elements LD1 to LD8. More specifically, based on an instruction from the CPU 105, the selector 113 selects the target value M1 in timing in which a voltage signal corresponding to a laser beam from the laser element LD1 is output from the current-voltage converter 110. Similarly, based on an instruction from the CPU 105, the selector 113 selects each of the target values M2 to M8 in timing in which a voltage signal corresponding to a laser beam from an associated one of the laser elements LD2 to LD8 is output from the current-voltage converter 110. Then, the selector 113 outputs the target values M1 to M8 to the comparator 111. The comparator 111 compares between the potentials of the respective target values M1 to M8 and those of voltage signals associated with the respective laser elements LD1 to LD8, and outputs obtained potential differences as comparison results to the automatic power control circuit 106. The automatic power control circuit 106 sets (controls) the values of drive currents to be supplied from the current sources 107-1 to 107-8 to the respective laser elements LD1 to LD8, according to the BD detection signal and the comparison results, such that the potential differences are reduced. More specifically, if the voltage value of a voltage signal is lower than a target value, it is indicated that the light amount of the associated laser beam is lower than its target light amount, so that a drive current to be supplied to the associated laser element LD is increased so as to cause the laser element LD to emit light by an amount corresponding to the target light amount. On the other hand, if the voltage value of a voltage signal is higher than a target value, it is indicated that the light amount of the associated laser beam is higher than its target light amount, so that a drive current to be supplied to the associated laser element LD is reduced so as to cause the laser element LD to emit light by an amount corresponding to the target light amount.

When the switches SW108-1 to SW108-8 are turned on by the PWM signal from the PWM signal-generating section 116, the set drive currents are applied to the laser elements LD1 to LD8 from the current sources 107-1 to 107-8, respectively.

FIG. 5 is a diagram useful in explaining timing for lighting the laser elements LD1 to LD8 appearing in FIG. 4.

As shown in FIG. 5, the BD detection signal is a low-level signal that is generated once during a single scan period. The automatic power control circuit 106 sequentially controls emission of the laser elements LD1 to LD8 over a non-image forming period based on the BD detection signal (automatic power control timing). In this case, the automatic power control circuit 106 controls the value of a drive current to be output from each of the current sources 107-1 to 107-8 to an associated one of the laser elements LD1 to LD8 such that the light amount of a laser beam output from the associated one of the laser elements LD1 to LD8 becomes equal to a predetermined value. On the other hand, in an image forming period, the switches SW108-1 to SW108-8 are turned on and off based on image data (i.e. the PWM signal), whereby drive currents having respective values to which the drive currents are controlled during the non-image forming period are supplied to the respective laser elements LD1 to LD8, and the laser elements LD1 to LD8 emit light (image data light emission).

As shown in FIG. 5, according to the image forming apparatus of the present embodiment, the laser element LD8 is lighted in timing in which a laser beam emitted from the laser element LD8 for generation of the BD detection signal enters the BD sensor 101. Further, a drive current to be supplied to the laser element LD8 in the image forming period is controlled based on output from the photodiode 109 having received the laser beam emitted at this time. The other laser elements LD1 to LD7 are lighted in an identical non-image forming period before the laser element LD8 is lighted. Then, the automatic power control is executed, whereby the values of drive currents to be supplied to the respective laser elements LD1 to LD7 in the following image forming period are controlled.

In the case of correcting image magnification, to correct image magnification in the sub scanning direction (hereinafter referred to as "the sub scanning magnification"), the polygon mirror control circuit 102 appearing in FIG. 4 performs control to change the rotational speed of the polygon mirror 405 (see FIG. 2). For example, in the case of reducing the sub scanning magnification by 1%, the rotational speed of the polygon mirror 405 is increased by 1%. On the other hand, in the case of increasing the sub scanning magnification by 1%, the rotational speed of the polygon mirror 405 is reduced by 1%.

Figure 7:
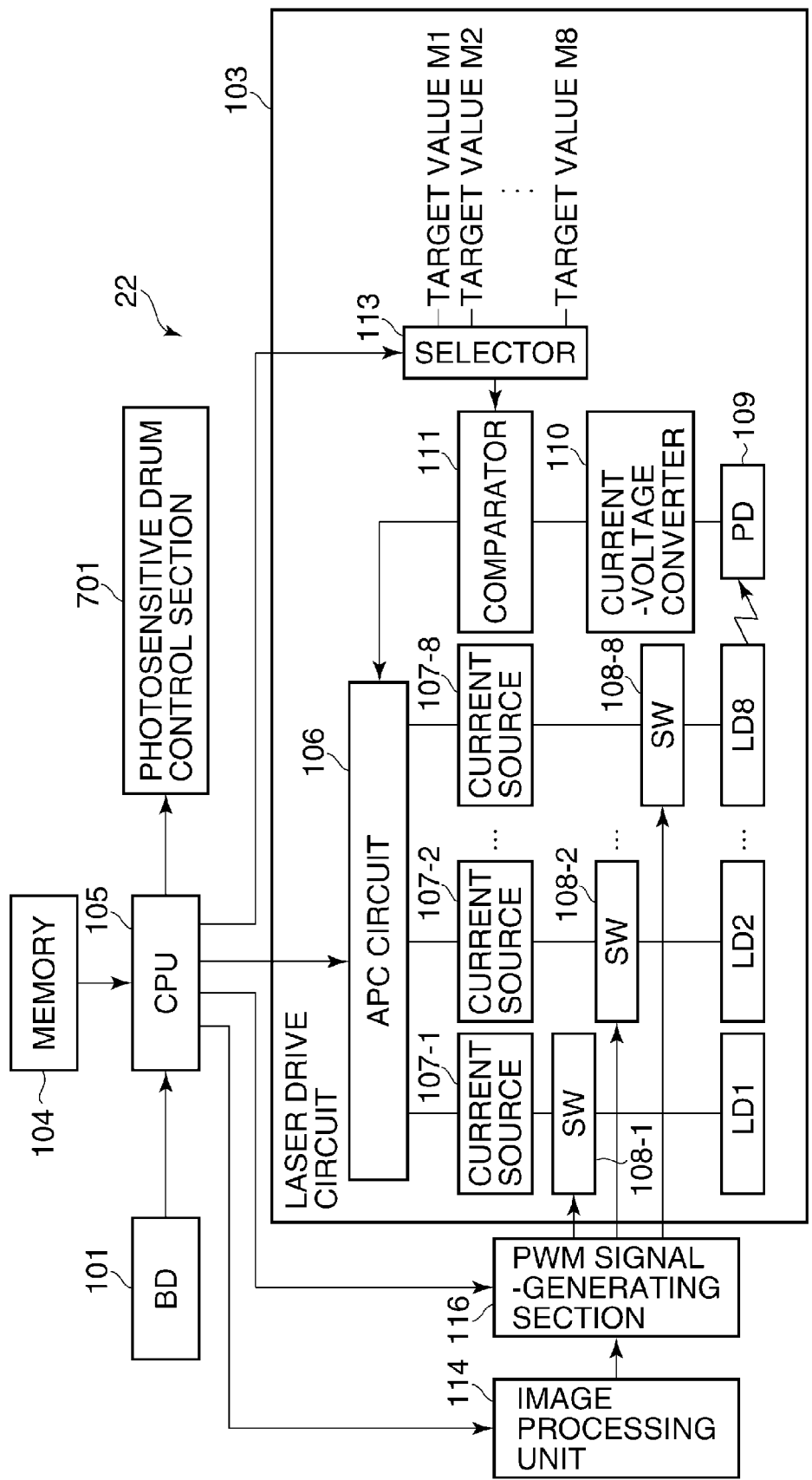
FIG. 7 is a block diagram of a variation of the controller used in the exposure control section appearing in FIG. 1.

Note that image magnification may be controlled by providing a photosensitive drum control section 701 as means for correcting image magnification, as shown in FIG. 7, and controlling the rotational speed of the photosensitive drum by the photosensitive drum control section 701. In the case of forming an image at a higher magnification than the reference magnification, the CPU 105 instructs the photosensitive drum control section 701 to make the rotational speed of the photosensitive drum lower than a rotational speed corresponding to the reference magnification. On the other hand, in the case of forming an image at a lower magnification than the reference magnification, the CPU 105 instructs the photosensitive drum control section 701 to make the rotational speed of the photosensitive drum higher than the rotational speed corresponding to the reference magnification.

Figure 6:
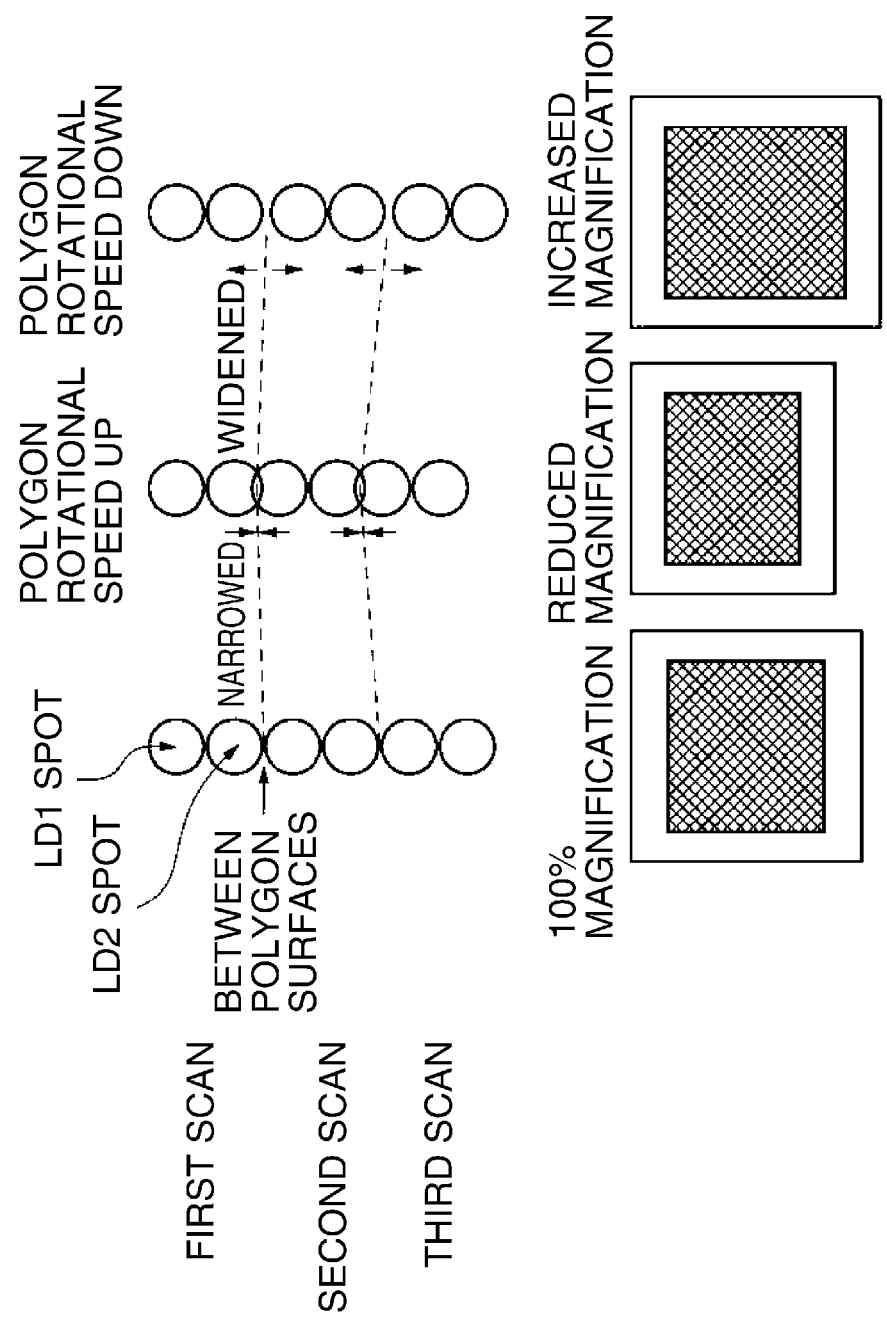
FIG. 6 is a view illustrating how laser spots shift when the rotational speed of a rotary polygon mirror is changed by a polygon mirror control circuit appearing in FIG. 4.

FIG. 6 is a view illustrating how laser spots shift when the rotational speed of the polygon mirror 405 is changed by the polygon mirror control circuit 102 appearing in FIG. 4. Although in FIG. 6, only the laser elements LD1 and LD2 are used for simplicity of explanation, the same problem occurs in an image forming apparatus provided with more than two laser elements. Referring to FIG. 6, it is assumed that the rotational speed of the polygon mirror 405 (see FIG. 2) is set to a reference rotational speed (first speed) in the case of forming an image at the reference magnification. Further, laser spots formed on the photosensitive drum by the laser elements LD1 and LD2 are referred to as "LD1 spot" and "LD2 spot", respectively. When the polygon mirror 405 is rotating at the reference rotational speed, space intervals between the LD1 spot and the LD2 spot on the photosensitive drum are uniform in first, second, and third scans. On the other hand, when the magnification is reduced (reduced magnification), i.e. when the rotational speed of the polygon mirror 405 is made higher than the reference rotational speed (polygon mirror rotational speed UP), the LD2 spot and the LD1 spot partially overlap each other between scanning lines formed on the photosensitive drum (i.e. between reflective surfaces of the polygon mirror). Further, when the magnification is increased (increased magnification), i.e. when the rotational speed of the polygon mirror 405 is made lower than the reference rotational speed (polygon mirror rotational speed DOWN), the LD2 spot and the LD1 spot are spaced from each other between scanning lines formed on the photosensitive drum. Thus, when the rotational speed of the polygon mirror 405 is changed from the reference rotational speed, space intervals between the LD1 spot and the LD2 spot on the photosensitive drum become non-uniform. This causes a problem described below.

Figure 8:
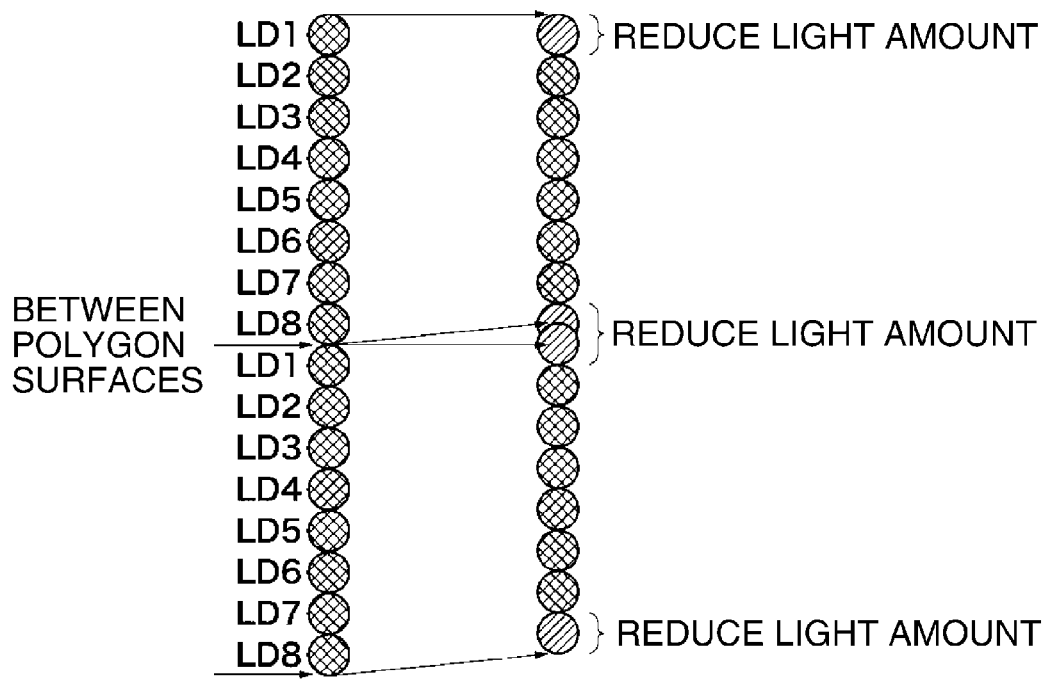
FIG. 8 is a view illustrating how the laser spots shift when image size is reduced in the sub scanning direction through correction of sub scanning magnification by the polygon mirror control circuit appearing in FIG. 4.
Figure 9:
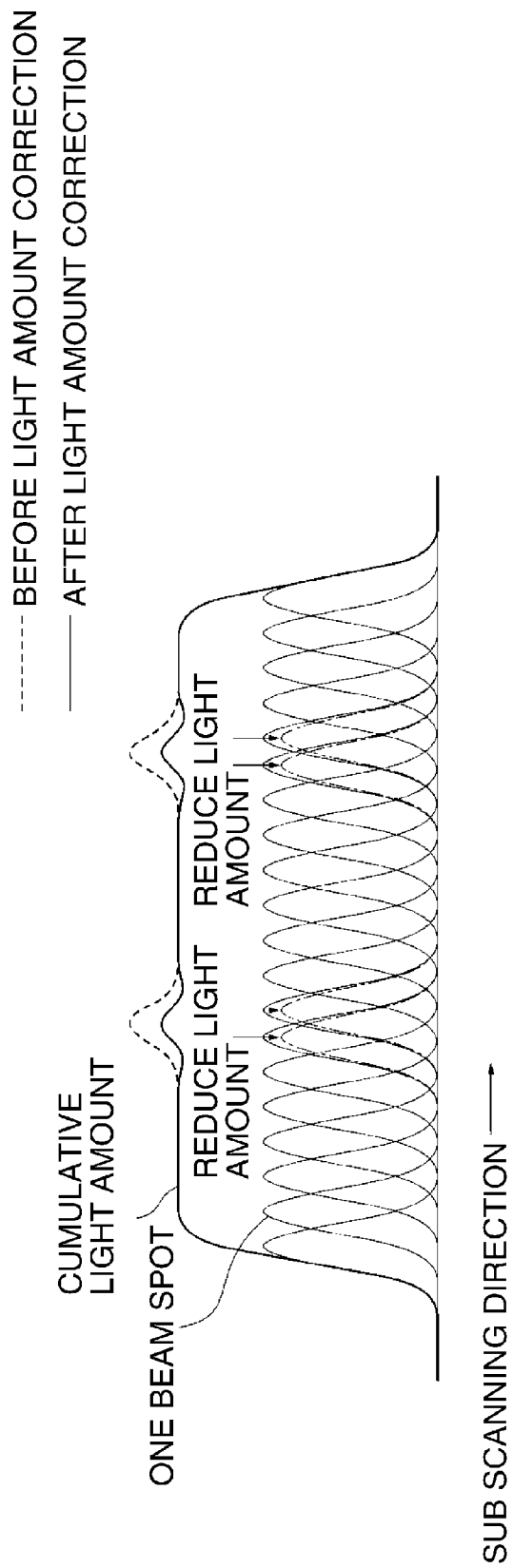
FIG. 9 is a diagram illustrating light amount distributions on the photosensitive member, which are obtained, respectively, before and after execution of the image size correction in FIG. 8.

FIG. 8 is a view illustrating how laser spots shift when image size in the sub scanning direction is reduced through correction of the sub scanning magnification by the polygon mirror control circuit 102 appearing in FIG. 4. FIG. 9 is a diagram illustrating light amount distributions obtained, respectively, before and after execution of the image size correction in FIG. 8.

As shown in FIG. 8, when the rotational speed of the polygon mirror 405 is made higher than the reference speed so as to reduce image size, a space interval between the LD1 spot and the LD8 spot adjacent thereto in the sub scanning direction is made narrower than a space interval between each adjacent two of the other LD spots. As a consequence, an area is produced where a space interval between scanning lines is locally narrowed in the sub scanning direction. As illustrated by portions shown by dotted lines in FIG. 9, a cumulative light amount increases in the area. Such a light amount variation causes a density variation in an image formed on the photosensitive drum.

In the image forming apparatus of the present embodiment, the light amount of one or both of the laser beams corresponding to one or both of the outermost scanning lines, in the direction of rotation of the photosensitive drum, of the scanning lines formed on the photosensitive drum is reduced so as to suppress occurrence of the light amount variation on the photosensitive drum. In the present example, the light amounts of both of the outermost beams of the laser beams which form the respective scanning lines are reduced to thereby correct the light amount variation.

Figure 10:
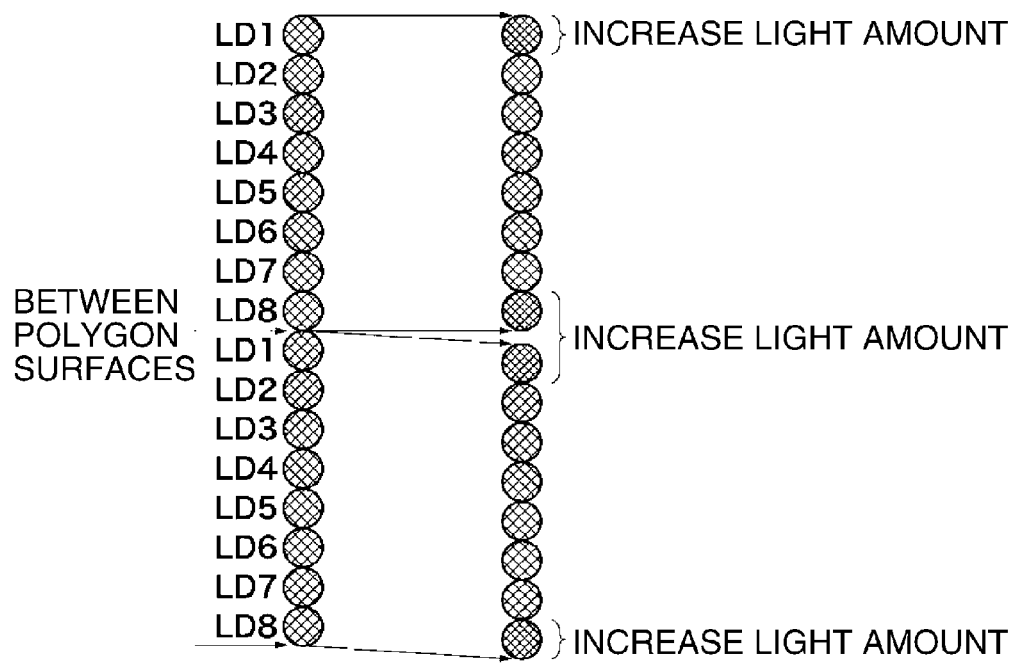
FIG. 10 is a view illustrating how laser spots shift when image size is increased in the sub scanning direction by the polygon mirror control circuit appearing in FIG. 5.

FIG. 10 is a view illustrating where laser spots are formed when image size is increased in the sub scanning direction by the polygon mirror control circuit 102 appearing in FIG. 4. FIG. 11 is a diagram illustrating light amount distributions obtained, respectively, before and after execution of the image size correction in FIG. 10.

As shown in FIG. 10, when the rotational speed of the polygon mirror is made lower than the reference speed so as to increase image size, the space interval between the LD1 spot and the LD8 spot adjacent thereto in the sub scanning direction becomes wider than the space interval between each adjacent two of the other LD spot. As a consequence, an area is produced where a space interval between scanning lines is locally increased in the sub scanning direction. As illustrated by portions shown by dotted lines in FIG. 11, a cumulative light amount is reduced in the area. Such a light amount variation causes a density variation in an image formed on the photosensitive drum.

In the image forming apparatus of the present embodiment, when increasing the image size, the light amount of one or both of the laser beams corresponding to one or both of the outermost scanning lines, in the direction of rotation of the photosensitive drum, of the scanning lines formed on the photosensitive drum is increased so as to suppress occurrence of the light amount variation on the photosensitive drum. In the present example, the light amounts of both of the outermost ones of the laser beams which form the respective scanning lines are increased to thereby correct the light amount variation.

The target values are stored in association with magnifications of respective images to be formed. More specifically, the memory provided in the selector 113 stores the target values M1 to M8 corresponding to the second magnification and target values M1' to M8' corresponding to the first magnification. When an image is to be formed at the second magnification, the selector 113 selects the target values M1 to M8 and outputs these to the comparator 111. On the other hand, when an image is to be formed at the first magnification, the selector 113 selects the target values M1' to M8' and outputs these to the comparator 111. In short, the image forming apparatus of the present embodiment is configured to be capable of changing the light amounts of laser beams by switching the target values between a case where image formation is performed at the first magnification and a case where image formation is performed at the second magnification.

For example, the memory provided in the selector 113 stores light amount correction tables, such as Table 1 and Table 2 shown below, in each of which the target values are set in association with the first magnification and the second magnification. The selector 113 selects image magnification-based target values from the light amount correction tables based on an instruction from the CPU 105.

Table 1 and Table 2 are light amount correction tables set with the second magnification as the reference magnification (100%). Table 1 is a light amount correction table for use when the first magnification (99%) is smaller than the second magnification. Table 2 is a light amount correction table for use when the first magnification (101%) is larger than the second magnification. The CPU 105 causes the selector 113 to select target values corresponding to a desired magnification. Note that the target values are held as digital values (e.g. 8-bit digital values), and a target value corresponding to the reference magnification is set to 200.

TABLE 1

| LASER ELEMENT NUMBER | TARGET VALUE CORRESPONDING TO FIRST MAGNIFICATION (99%) | TARGET VALUE CORRESPONDING TO SECOND MAGNIFICATION (100%) |
| --- | --- | --- |
| LD1 | 180(M1') | 200(M1) |
| LD2 | 200(M2') | 200(M2) |
| LD3 | 200(M3') | 200(M3) |
| LD4 | 200(M4') | 200(M4) |
| LD5 | 200(M5') | 200(M5) |
| LD6 | 200(M6') | 200(M6) |
| LD7 | 200(M7') | 200(M7) |
| LD8 | 180(M8') | 200(M8) |

TABLE 2

| LASER ELEMENT NUMBER | TARGET VALUE CORRESPONDING TO FIRST MAGNIFICATION (101%) | TARGET VALUE CORRESPONDING TO SECOND MAGNIFICATION (100%) |
| --- | --- | --- |
| LD1 | 220(M1') | 200(M1) |
| LD2 | 200(M2') | 200(M2) |
| LD3 | 200(M3') | 200(M3) |
| LD4 | 200(M4') | 200(M4) |
| LD5 | 200(M5') | 200(M5) |
| LD6 | 200(M6') | 200(M6) |
| LD7 | 200(M7') | 200(M7) |
| LD8 | 220(M8') | 200(M8) |

Figure 12A:
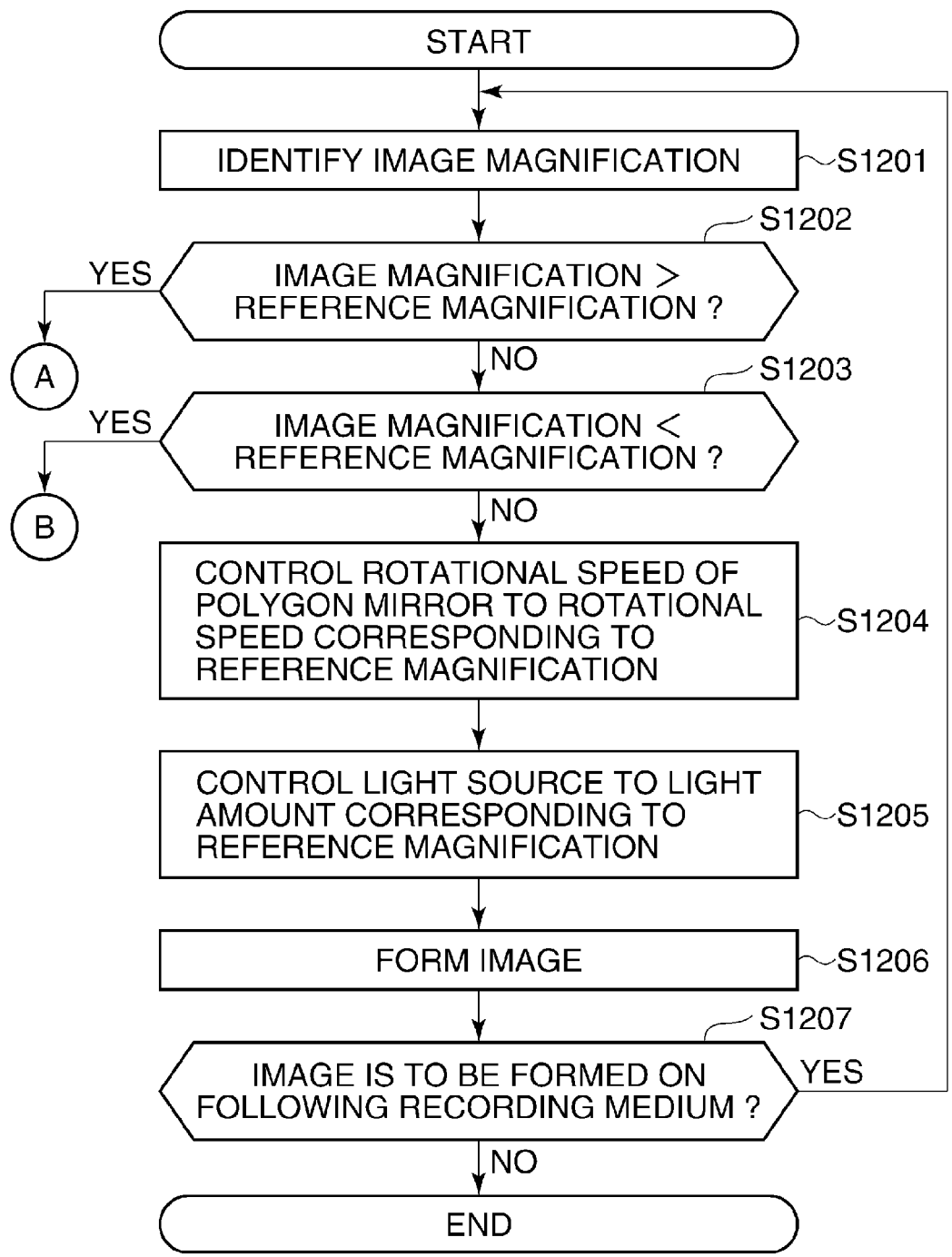
FIGS. 12A to 12C are a flowchart of a control process executed by a CPU.
Figure 12B:
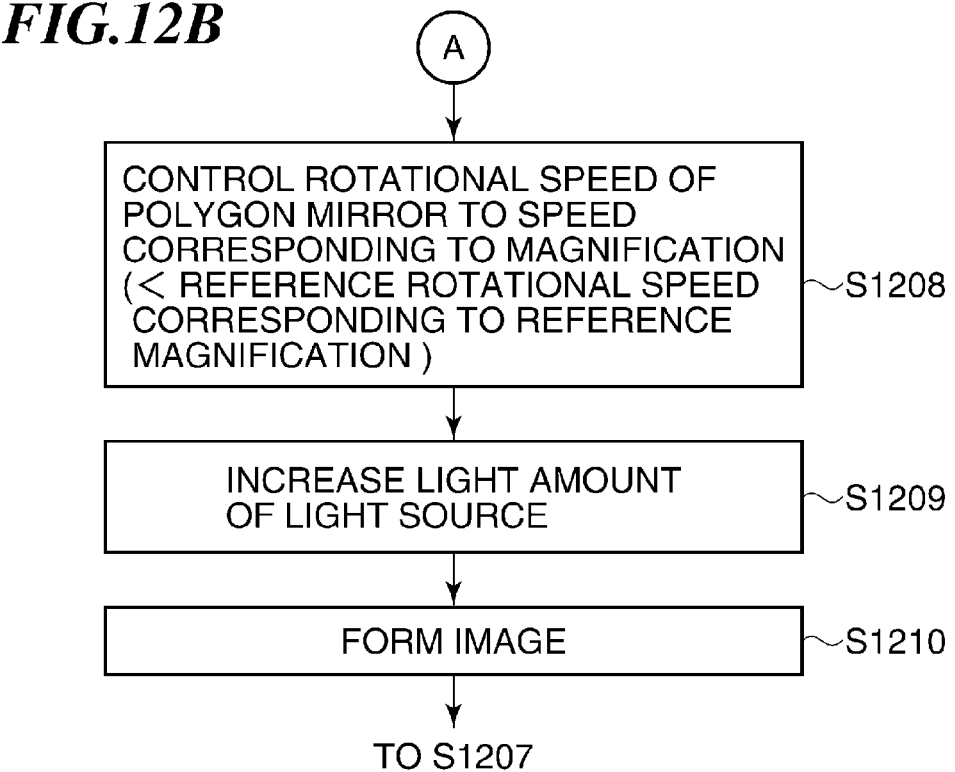
Figure 12C:
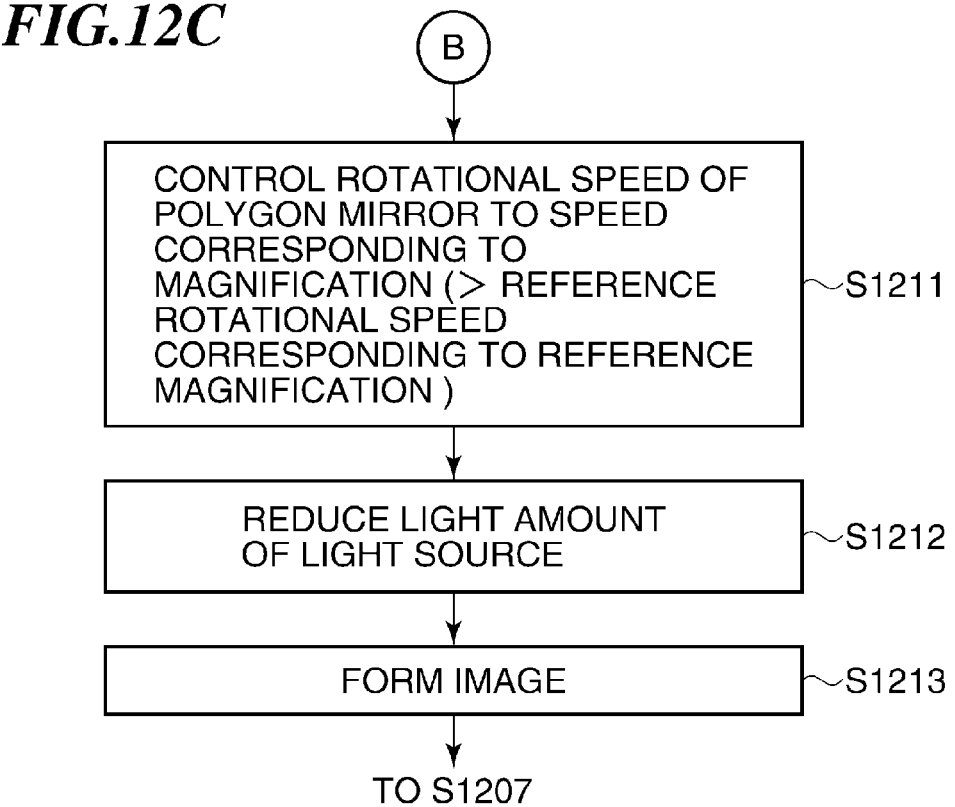

FIGS. 12A, 12B, and 12C are a flowchart of a control process executed by the CPU 105. The present control process is started in response to the inputting of image data. Referring to FIG. 12A, the CPU 105 identifies the magnification of an image to be formed based on the input image data (step S1201). Then, the CPU 105 determines whether or not the image magnification identified in the step S1201 is larger than the reference magnification (step S1202). If the image magnification is larger than the reference magnification, the process proceeds to a step S1208 in FIG. 12B. If it is determined in the step S1202 that the image magnification is not larger than the reference magnification, the CPU 105 determines whether or not the image magnification is smaller than the reference magnification (step S1203). If it is determined in the step S1203 that the image magnification is smaller than the reference magnification, the process proceeds to a step S1211 in FIG. 12C.

After execution of the step S1203, the CPU 105 controls the rotational speed of the polygon mirror to a rotational speed corresponding to the reference magnification (step S1204) and controls the light amounts of the light sources to a light amount corresponding to the reference magnification (step S1205). Thereafter, the CPU 105 executes image formation (step S1206) and then determines whether or not to form an image on the following recoding medium (step S1207). If it is determined in the step S1207 that an image is to be formed on the following recoding medium, the process returns to the step S1201. If it is determined in the step S1207 that there is no image to be formed on the following recoding medium, the present control process is terminated.

If it is determined in the step S1202 that the image magnification is larger than the reference magnification, the CPU 105 controls the rotational speed of the polygon mirror to a rotational speed (<reference speed) corresponding to the image magnification identified in the step S1201 (step S1208) and controls the light amounts of the light sources to a light amount corresponding to the image magnification identified in the step S1201 (step S1209). Particularly in an image forming apparatus provided with a plurality of laser elements LD, the CPU 105 executes control processing for increasing at least one of the light amounts of the light beams that move on the photosensitive drum at respective opposite ends of the scanning lines. Then, the CPU 105 executes image formation (step S1210), followed by returning the process to the step S1207.

If it is determined in the step S1203 that the image magnification is smaller than the reference magnification, the CPU 105 controls the rotational speed of the polygon mirror to a rotational speed (>reference speed) corresponding to the image magnification identified in the step S1201 (step S1211) and controls the light amounts of the light sources to a light amount corresponding to the image magnification identified in the step S1201 (step S1212). Particularly in an image forming apparatus provided with a plurality of laser elements LD, the CPU 105 executes control processing for reducing at least one of the light amounts of the light beams that move on the photosensitive drum at respective opposite ends of the scanning lines. Then, the CPU 105 executes image formation (step S1213), followed by returning the process to the step S1207. Note that the identification of the magnification of an image is performed in the following manner: When a user designates a magnification from a console section, not shown, the CPU 105 identifies a magnification based on data concerning the magnification input from the console section. Further, when an image is to be formed on the reverse side of a recording medium (transfer sheet), the CPU 105 determines a magnification of an image to be formed on the riverside side based on a type of the recording medium. Data of the amount of contraction or the amount of elongation of recording media after passing the fixing device 35 can be stored in the memory 104 or the like in advance. Therefore, by identifying a type of the recording medium, it is possible to determine the magnification of the image to be formed on the recording medium. The user inputs the types of recording media stored in the cassettes 4 and 5 from the console section. The CPU 105 causes data of the types of the recording media input from the console section to be stored in the memory 104. The CPU 105 identifies the magnification of the image to be formed on the reverse side of the recording medium based on the type of the recording medium determined by referring to a user's setting of selection of the cassette 4 or 5.

As described above, in the case of performing automatic power control, the target values for the laser element LD1 and the laser element LD8 are changed between a case where image formation is performed at the first magnification and a case where image formation is performed at the second magnification. As a consequence, the light amounts of the laser elements LD1 and LD8 in the image forming period are made different between the two cases, which makes it possible to suppress non-uniformity of light amount distribution on the photosensitive drum as shown in FIGS. 9 and 11.

Figure 13:
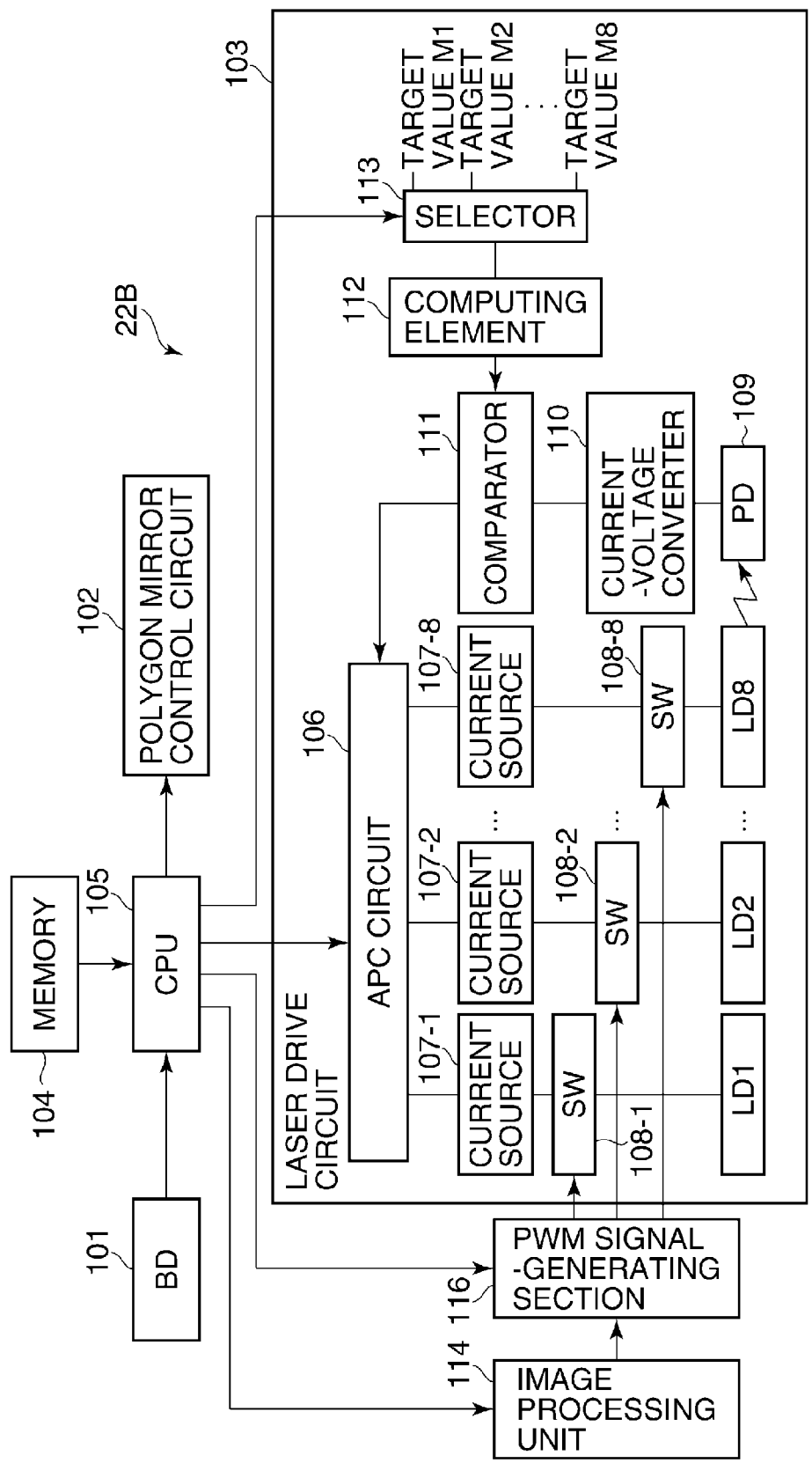
FIG. 13 is a block diagram of a controller used in an exposure control section of an image forming apparatus according to a second embodiment of the present invention.

Next, a description will be given of an image forming apparatus according to a second embodiment of the present invention. The component elements of the image forming apparatus of the second embodiment are identical to those of the image forming apparatus of the first embodiment, and therefore description thereof is omitted, with the same reference numerals denoting the same component elements, respectively. FIG. 13 is a block diagram of a controller used in the exposure control section 22 of the image forming apparatus according to the second embodiment of the present invention. The controller shown in FIG. 13 is used to execute the light amount correction similarly to the first embodiment.

The controller shown in FIG. 13 is different in configuration from the controller 22A shown in FIG. 4. Therefore, the controller shown in FIG. 13 is denoted by reference numeral 22B. Further, component elements of the controller 22B corresponding to those of the controller 22A are denoted by identical reference numerals, and description thereof is omitted.

The controller 22B has the memory 104, the CPU (central processing unit) (light amount setting unit) 105, and an computing element 112. The CPU 105 operates according to programs stored e.g. in the memory 104. In an example shown in FIG. 12, the CPU 105 delivers a rotational speed-designating signal indicative of a rotational speed designated according to image magnification to the polygon mirror control circuit 102. Further, the CPU 105 delivers light amount ratio signals indicative of a light amount ratio to the computing element 112. In the example shown in FIG. 12, the CPU 105 outputs first to eighth light amount ratio signals in association with the respective laser elements LD1 to LD8. The laser drive circuit 103 operates in synchronism with the BD signal as described with reference to FIG. 4. The laser drive circuit 103 performs automatic power control in the non-image forming period, and controls light emission of the laser elements LD1 to LD8 in the image forming period according to image data.

In the automatic power control, the laser drive circuit 103 controls the output current of each of the current sources 107-1 to 107-8 such that the light amount of an associated laser beam becomes equal to a predetermined value, as described hereinbefore. The current-voltage converter 110 delivers detected light amount voltage values indicative of respective light amounts detected by the photodiode 109 to the comparator 111. In the present example, first to eight detected light amount voltage values are output from the current-voltage converter 110 in association with the respective laser elements LD1 to LD8.

The image forming apparatus of the second embodiment is distinguished from the image forming apparatus of the first embodiment in that the computing element 112 is provided between the selector 113 and the comparator 111. The computing element 112 receives the target values M1 to M8 or M1' to M8' from the selector 113 according to magnification. For example, the CPU 105 outputs the first to eighth light amount ratio signals in association with the respective laser elements LD1 to LD8. The selector 113 selectively outputs one of the target values M1 to M8 according to associated one of the first to eighth light amount ratio signals. More specifically, when receiving the first light amount ratio signal, the selector 113 selects the target value M1 and delivers the same to the computing element 112. The computing element 112 multiplies the target values M1 to M8 by the first and eighth light amount ratios indicated by the first to eighth light amount ratio signals, respectively, to thereby obtain first to eight multiplication products, and outputs first to eight multiplication product signals indicative of the first to eight multiplication products. The first to eight multiplication product signals are delivered to the comparator 111. The comparator 111 compares the first to eight detected light amount voltage values with the respective first to eight multiplication products, and delivers first to eight comparison results to the automatic power control circuit 106.

The automatic power control circuit 106 controls the output current of each of the current sources 107-1 to 107-8, based on the associated one of the first to eight comparison results, such that outputs of the photodiode 109 (i.e. the first to eight detected light amounts) become equal to the respective first to eight multiplication products. In short, the automatic power control circuit 106 controls the amount of light emitted from each of the laser elements LD1 to LD8, according to an associated one of the first to eight comparison results. As a consequence, the light amounts of the laser beams from the respective laser elements LD1 to LD8 are adjusted to the target values M1 to M8, respectively, whereafter the laser power of each laser element is set according to an associated one of the first to eighth light amount ratios. Note that the target light amounts M1 to M8 associated with the respective laser elements LD1 to LD8 are adjusted in a factory such that the amount of light to be irradiated onto the photosensitive drum 408 (see FIG. 2) becomes equal to a desired value.

By the way, in a case where laser beams are irradiated onto the photosensitive drum 408 via the optical system, the laser beams are different in transmission efficiency. This causes variations in the ratio of the amount of light irradiated onto the photosensitive drum 408 to the amount of light emitted from the laser chip surface. Therefore, in adjustment in the factory, the laser elements LD1 to LD8 are lighted individually, and a light amount is measured at each laser beam irradiation position on the photosensitive drum 408. Then, the target values M1 to M8 are set such that the light amount of each laser beam becomes equal to a desired value.

Further, in assembly in the factory, the beam pitch interval varies in the sub scanning direction with respect to an ideal pitch interval due to variation in products and mounting tolerances of respective component parts. For this reason, in the present example, light amount control is performed according to beam pitch intervals after the assembly. For example, beam pitch data indicative of beam pitch intervals is stored in the memory 104 in advance. In this case, the beam pitch intervals are measured after the assembly and adjustment in the factory. For the measurement, exposure and scanning is performed with the laser elements LD1 to LD8 held in a light-emitting state. Then, each scanning light (laser beam) is monitored by a CCD (charge coupled device) camera, whereby a scanning position is measured. Then, the distance between the respective laser beams corresponding to opposite ends of the laser beams arranged in the sub scanning direction is stored in the memory 104.

As described hereinbefore, the CPU 105 sets the rotational speed of the polygon mirror 405 (see FIG. 2) as well as the target light amounts M1 to M8 associated with the respective laser elements LD1 to LD8. In doing this, the CPU 105 calculates the space interval between a last scanning line in one scan and a first scanning line in the next scan (i.e. the scan-to-scan line interval) based on the rotational speed of the polygon mirror 405 and the beam pitch data read out from the memory 104. Then, the CPU 105 sets a laser power in a scan-to-scan boundary according to the calculated scan-to-scan line interval. More specifically, in a case where the polygon mirror is rotated at a rotational speed different from the reference speed, the CPU 105 forms an image not with the target light amount M1 for the laser element LD1, but with a light amount Mcor1. Similarly, in a case where the polygon mirror is rotated at a rotational speed different from the reference speed, the CPU 105 forms an image not with the target light amount M8 for the laser element LD8, but with a light amount Mcor8.

Figure 14:
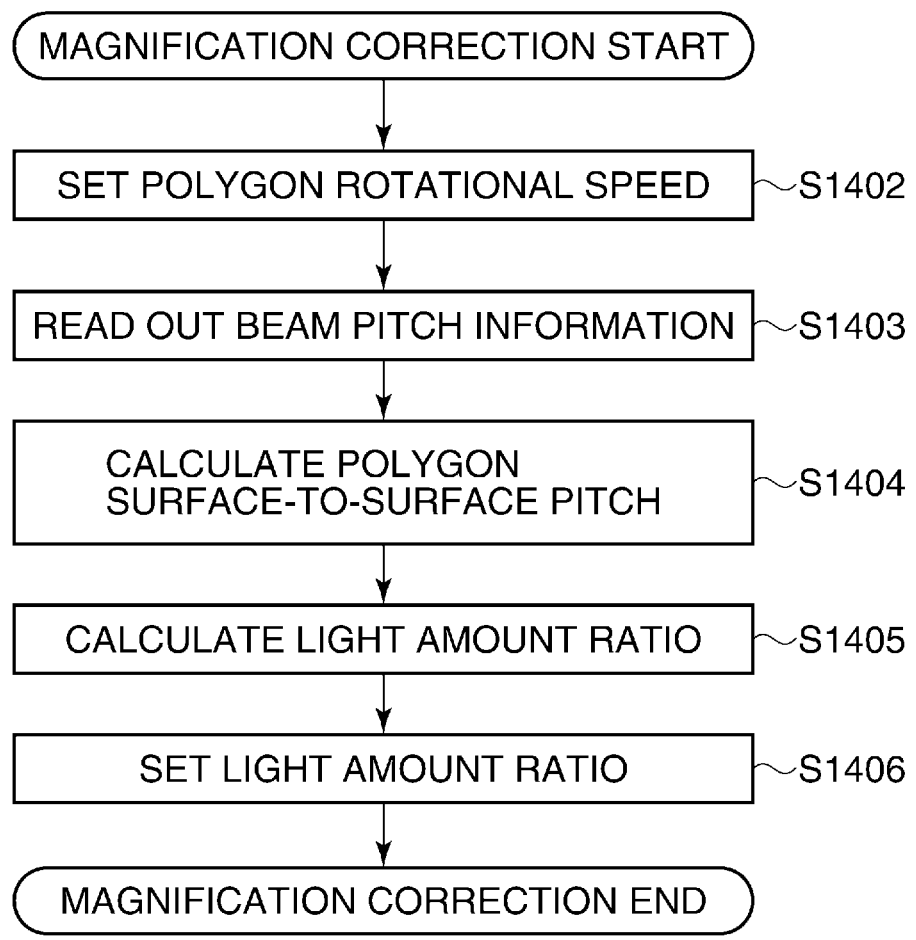
FIG. 14 is a flowchart of a magnification correction process which is executed by the controller in FIG. 13 for light amount correction (image magnification correction) corresponding to image magnification.

FIG. 14 is a flowchart of a magnification correction process which is executed by the controller 22B in FIG. 13 for light amount correction (image magnification correction) corresponding to image magnification. When the image magnification correction is started, the CPU 105 changes the rotational speed of the polygon mirror 405 (see FIG. 2) according to the change ratio of magnification in the sub scanning direction (step S1402). Then, the CPU 105 reads out sub scanning pitch information between laser beams (beam pitch data) from the memory 104 (step S1403). The sub scanning pitch information is indicative of a beam-to-beam distance in the sub scanning direction between laser beams to be irradiated onto the photosensitive drum 408 (see FIG. 2), as described hereinbefore. The sub scanning pitch information is obtained by measurement after adjustment in a factory and stored in the memory 104.

The CPU 105 calculates the scanning line interval between scans in the sub scanning direction (i.e. the scan-to-scan line interval (pitch)) based on the rotational speed of the polygon mirror 405 and the beam pitch data, using the following equations (1) and (2) (step S1404):

Variation amount of scan-to-scan line interval=(ideal pitch×beam count)×magnification change ratio−(beam-to-beam pitch×beam count) (1)

Scan-to-scan line interval=ideal pitch−variation amount of scan-to-scan line interval (2)

The term "ideal pitch" is intended to mean an space interval between laser beams determined when it is assumed that there is no pitch interval variation e.g. due to variations in component parts.

Then, the CPU 105 determines a ratio between the scan-to-scan line interval and the beam-to-beam pitch and calculates the light amount ratios of the respective laser beams in the scan-to-scan boundary (i.e. the first ((to)) and eighth light amount ratios) using the following equation (3) (step S1405):

Light amount ratio (beam-to-beam pitch variation rate)=scan-to-scan line interval/beam-to-beam pitch (3)

Then, the CPU 105 sets the light amount ratio calculated as above (step S1406). Thus, the CPU 105 sets a scan-to-scan laser beam light amount according to the light amount ratio to thereby control the scan-to-scan laser beam light amount. Note that the outermost ones of the laser beams which form the respective scanning lines correspond to laser beams positioned at the opposite ends of the laser beams arranged in the sub scanning direction (i.e. the direction of rotation of the photosensitive drum). In a case where the light amount ratio of the end laser beams is changed, if difference in light amount between laser beams is large, dot density largely differs between dots formed by a laser beam with a larger light amount and dots formed by a laser beam with a smaller light amount.

For this reason, differences in density between dots are conspicuous particularly when so-called isolated dots are formed. Further, when a single dot is formed by a plurality of laser beams different in light amount, the center-of-gravity position of the dot is shifted toward the exposure position of a laser beam with a larger light amount. As a consequence, the position of the dot is shifted. To prevent this, in the illustrated example, the light amounts of the laser beams at the respective opposite ends are changed by the same amount. This makes the ratio of change in laser beam light amount smaller than in a case where only the light amount of a laser beam positioned at one end is changed. Although in the illustrated example, the light amounts of two of the laser beams positioned at the opposite ends are controlled, the light amounts of more than two of the laser beams positioned at the opposite ends may be controlled.

In the above-described example, the light amounts of laser beams between scans are thus controlled according to change in magnification. This makes it possible to reduce density variation due to change in the scanning line interval between scans (i.e. the scan-to-scan line interval) in a case where magnification change is performed by controlling the speed of the polygon mirror. Further, the light amount of each of the laser beams is controlled according to the beam pitch interval in the sub scanning direction, which is set upon assembly in a factory. This also makes it possible to reduce density variation due to variation in beam pitch interval in the sub scanning direction between products of the exposure controller 22. Further, in the above example, light amount control is performed by changing the light amounts of the laser beams positioned at the respective opposite ends by the same amount. This enables the light amounts to be set in association with the respective laser beams such that the difference between the laser beams is minimized, so that it is possible to minimize the variation in density and the variation in the center-of-gravity position of each dot.

Next, a description will be given of a variation of the exposure controller of the image forming apparatus according to the second embodiment of the present invention. In the present variation, image magnification is changed on each of the front and reverse sides of a recording sheet in the double-sided printing mode, to thereby prevent occurrence of density difference between the front and reverses side of the recording sheet. Note that a controller used in the variation of the exposure controller is identical in configuration to the controller 22B in FIG. 13, but is distinguished from the same by the operation of the CPU 105.

Figure 15:
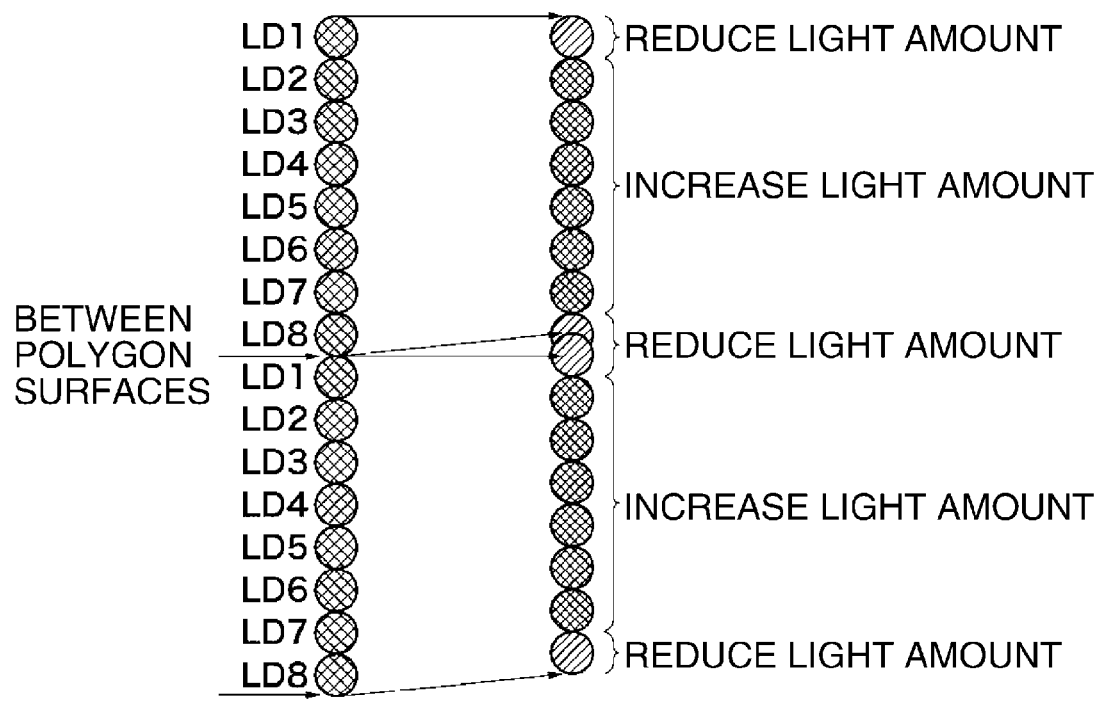
FIG. 15 is a view illustrating laser spots on a recording sheet before and after magnification correction performed for double-sided printing when exposure is performed by a variation of the exposure control section of the image forming apparatus according to the second embodiment of the invention.

FIG. 15 is a view illustrating laser spots on a recording sheet before and after magnification correction performed for double-sided printing when exposure is performed by the exposure controller 22 appearing in FIG. 2. Further, FIG. 16 is a diagram illustrating light amount distributions obtained, respectively, in a case where pitches between all the laser spots are uniformly narrowed for magnification correction and in a case where only a laser beam spot pitch between scans is narrowed.

Figure 16:
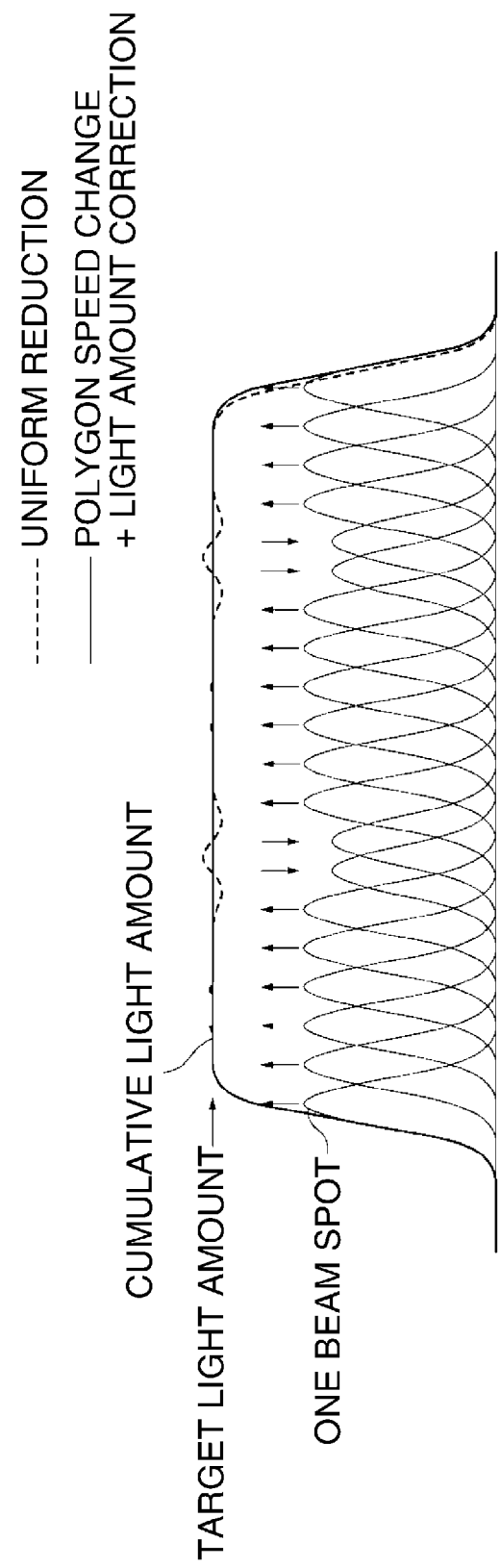
FIG. 16 is a diagram illustrating light amount distributions on the photosensitive member, which are obtained, respectively, in a case where pitches between all the laser spots are uniformly narrowed for magnification correction and in a case where only a laser beam interval between scans (scan-to-scan line interval) is narrowed.

Referring to FIGS. 15 and 16, the photosensitive drum 408 is exposed and scanned using a plurality of laser beams (i.e. the laser elements LD1 to LD8). At this time, the image magnification of the second side (reverse side) of a recording sheet is corrected with respect to that of the front side by controlling the rotational speed of the polygon mirror 405, so as to expand or contract an image on the second side (reverse side) of the recording sheet. In this case, when the rotational speed of the polygon mirror 405 is controlled, the laser beam interval between scans is narrowed. On the other hand, the pitch between the laser beams is fixed and hence remains unchanged. As a consequence, a density difference occurs between the scan-to-scan boundary area and the other area than the boundary area compared with a case where magnification change is performed uniformly by scanning using a single laser beam. In double-sided printing, by changing only the amount of light in an area close to the scan-to-scan boundary for magnification change as described in the first embodiment, the light amount is smoothed, whereby density variation is reduced. However, the density of an entire image on the front side of the recording sheet is made different from that on the reverse side of the same.

In the present variation, during reverse-side printing on a recording sheet, the light amounts of laser beams in the area close to the scan-to-scan boundary are controlled according to the rotational speed of the polygon mirror 405 to thereby reduce density variation. Further, the light amounts of laser beams in the other area than the area close to the scan-to-scan boundary area are also controlled such that the density of an entire image on the reverse side of the recording sheet becomes equal to the density on the front side. The following description will be basically given of different points from the above-described first embodiment. In this variation, not only the light amounts of the laser beams positioned at the opposite ends controlled but also the light amounts of the non-end laser beams are controlled according to a change in the scan-to-scan laser beam interval. Thus, the total light amount obtained by adding up the light amounts of all the laser beams is made uniform between the front and reverse sides of a recording sheet.

Figure 17:
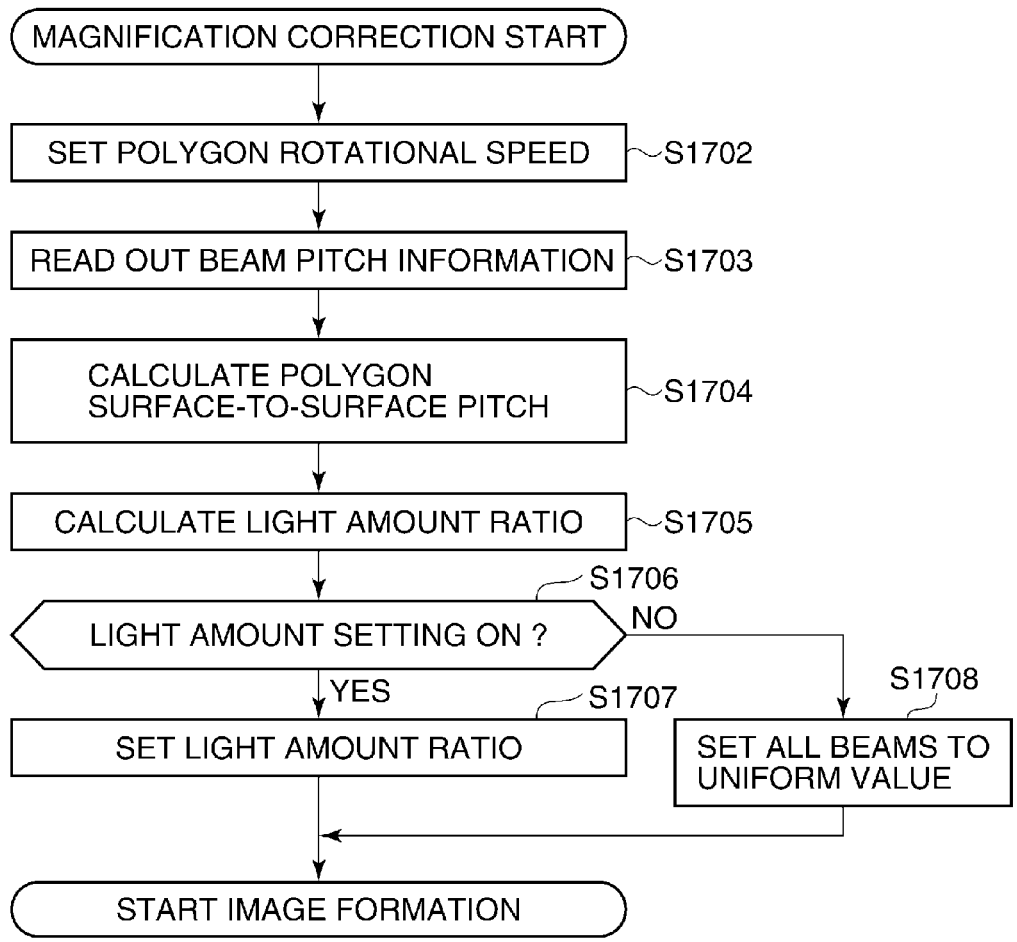
FIG. 17 is a flowchart of another magnification correction process which is executed by the controller in FIG. 13 for light amount correction (image magnification correction) corresponding to image magnification.

FIG. 17 is a flowchart of a magnification correction process which is executed by the controller in FIG. 13 for light amount correction (image magnification correction) corresponding to image magnification.

Referring to FIG. 17, when the image magnification correction is started, the CPU 105 changes the rotational speed of the polygon mirror 405 (see FIG. 2) according to a change ratio of magnification in the sub scanning direction (step S1702). Then, the CPU 105 reads out sub scanning pitch information (beam pitch data) from the memory 104 (reading-out of beam pitch information) (step S1703). The CPU 105 calculates the scan-to-scan line interval using the above-described equations (1) and (2) (step S1704). Then, the CPU 105 calculates the light amount ratios of the respective laser beams in the scan-to-scan boundary according to the above-described equation (3) (step S1705).

Thereafter, the CPU 105 determines whether or not light amount setting is on (step S1706). If light amount setting is on (YES to the step S1706), the CPU 105 sets the light amount ratio calculated as above (step S1707). Then, the CPU 105 sets the scan-to-scan laser beam light amount according to the light amount ratio and starts image formation while controlling the scan-to-scan laser beam light amount. On the other hand, if light amount setting is off (NO to the step S1706), the CPU 105 sets a uniform value for all laser beams (step S1708), followed by starting image formation.

The CPU 105 calculates light amount ratios of the laser beams positioned at the respective opposite ends, using the equations (1) to (3), as described hereinbefore. Then, the CPU 105 sets the light amounts of the end laser beams and those of the non-end laser beams such that the calculated light amount ratios are satisfied and the aforementioned total light amount is held constant before and after execution of magnification correction. For example, the CPU 105 calculates a light amount change ratio based on the following equation (4), and determines the light amounts of the end beams and those of the non-end beams based on the following equations (5) and (6):

Light amount change ratio=1+{(end beam light amount setting ratio−1)×(end beam count/total beam count)}     (4)

End beam light amount=initial light amount×end beam light amount setting ratio/light amount change ratio     (5)

Non-end beam light amount=initial light amount/light amount change ratio     (6)

When the end beam light amount is set by the end beam light amount setting ratio obtained using the equations (1) to (3), the light amounts of the end laser beams change. As a consequence, the total light amount of all the laser beams changes. The above-described equation (4) represents the change ratio of the total light amount. The change ratio of the total light amount is obtained based on the product of the light amount ratio of the end laser beams and the number of end laser beams. Further, by dividing the total light amount by the total number of all laser beams, it is possible to obtain the light amount change ratio averaged by all the laser beams.

The end beam light amount is obtained from the equation (5), and a value obtained by dividing a value obtained by multiplying a preset light amount (initial light amount) for the front side of a recording sheet by the light amount ratio of the end laser beam, by the light amount change ratio is set as the light amount value. The non-end beam light amount is obtained from the equation (6), and a value obtained by dividing the preset light amount (initial light amount) for the front side of the recording sheet by the light amount change ratio is set as the non-end beam light amount.

As described above, in the case of performing double-side printing, the CPU 105 sets the end beam light amount and the non-end beam light amount for the reverse side of the recording sheet. When the beam light amounts are thus set, the total light amount of all the laser beams is set to be equal between the front and reverse sides of a recording sheet.

In the case of reducing the magnification on the reverse side of a recording sheet, the CPU 105 sets the light amounts of the respective laser beams such that the light amounts of the beams at the respective opposite ends are reduced and the non-end beam light amounts are increased. More specifically, in the case of reducing the magnification on the reverse side of a recording sheet, the CPU 105 makes the light amounts of the beams at the respective opposite ends smaller than a predetermined reference light amount and the non-end beam light amounts larger than the predetermined reference light amount. On the other hand, in the case of increasing the magnification on the reverse side of a recording sheet, the CPU 105 sets the light amounts of the respective laser beams such that the light amounts of the beams at the respective opposite ends are increased and the non-end beam light amounts are reduced. More specifically, the CPU 105 makes the light amounts of the beams at the respective opposite ends larger than the predetermined reference light amount and the non-end beam light amounts smaller than the predetermined reference light amount. In either of the cases, the end beam light amounts and the non-end beam light amounts are set, as described hereinbefore, such that the total light amount of all the laser beams are made uniform on the front and reverse sides of the recording sheet. This make it possible to perform image formation with density uniform on the front and reverse sides of the recording sheet.

Figure 18:
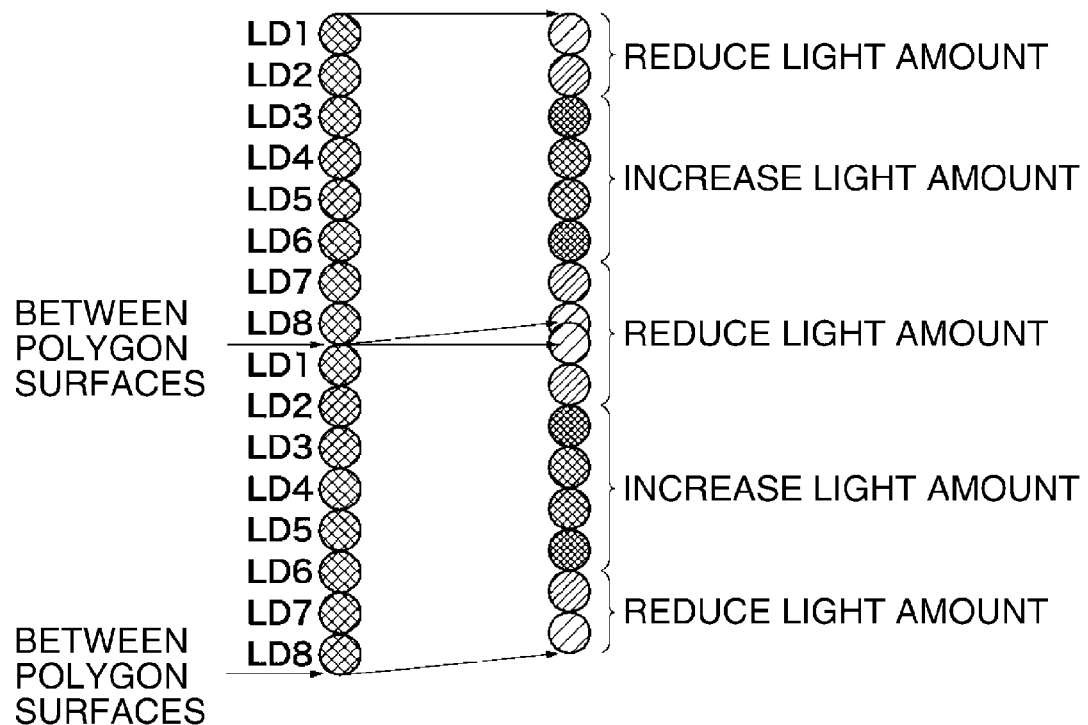
FIG. 18 is a view illustrating laser spots formed after the controller in FIG. 13 has performed stepwise light amount correction on each of the laser elements.
Figure 19:
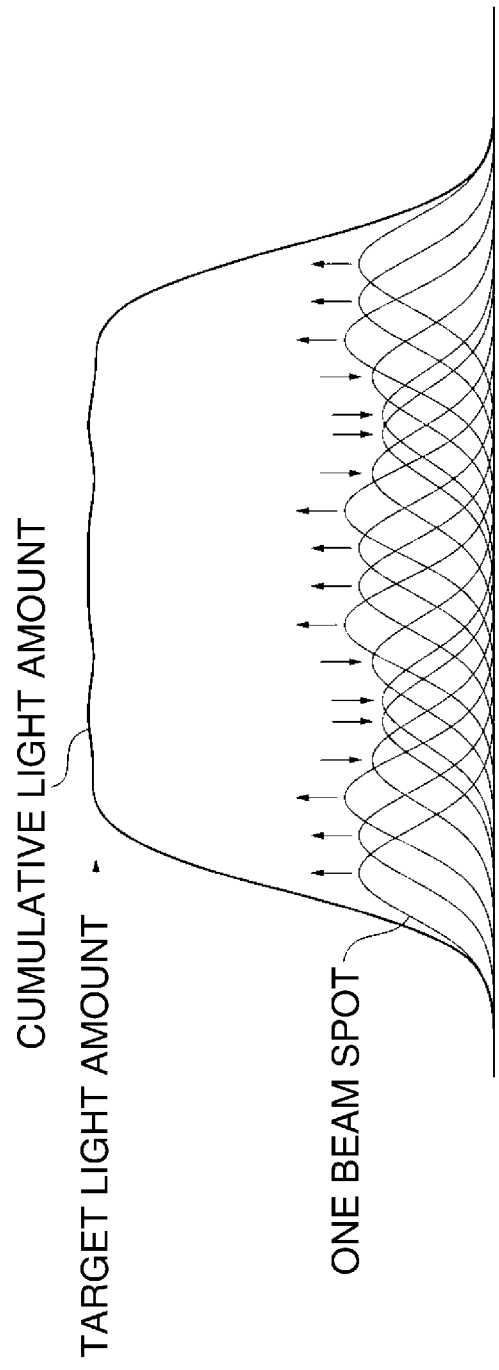
FIG. 19 is a diagram illustrating a light amount distribution on the photosensitive member, which is obtained by execution of the light amount correction shown in FIG. 18.

FIG. 18 is a view illustrating laser spots formed after the controller 22B in FIG. 13 has performed stepwise light amount correction on each of the laser elements LD1 to LD8. FIG. 19 is a diagram illustrating a light amount distribution obtained after execution of the light amount correction shown in FIG. 18.

Referring to FIGS. 18 and 19, in the present example, the CPU 105 sets the light amounts of a plurality of laser beams (i.e. the laser elements LD1 to LD8) stepwise such that the cumulative light amount of pixels continuous in the sub scanning direction is smoothed. In performing exposure and scanning such that laser spots overlap each other, the light amount can be smoothed by executing stepwise light amount correction on the laser beams. As a consequence, it is possible to further reduce density variation in image formation.

As described above, in the second embodiment, light amount control is performed on the non-end laser beams as well such that the total light amount of all the laser beams becomes equal to a predetermined value (light amount). This makes it possible to hold image density uniform on both the front and reverse sides of a recording sheet during double-sided printing. Further, in a case where exposure and scanning is performed such that laser spots overlap each other, if stepwise light amount setting (light amount correction) is performed, density variation can be reduced in image formation.

Now, a description will be given of an image forming apparatus according to a third embodiment of the present invention. The image forming apparatus of the third embodiment is distinguished from the image forming apparatuses of the first and second embodiments by an exposure controller. The other component elements of the image forming apparatus of the third embodiment are identical to those of the image forming apparatus of the first embodiment, and therefore description thereof is omitted, with the same reference numerals denoting the same component elements, respectively. In the third embodiment, an image defect is prevented from occurring in a specific image pattern when light amount correction is performed simultaneously with magnification change. For this purpose, the exposure controller in the third embodiment is configured to perform on-off control for light amount correction depending on an image pattern. In the above-described first and second embodiments, when light amount correction is performed, an image defect occurs in an image having a specific frequency component. The frequency component which causes the image defect can be expressed by the following equation (7). Hereafter, an image having the specific frequency component is referred to as "a specific image pattern".

$$\text{Spatial frequency } A = n \times \text{beam count} \times \text{beam pitch interval}/2 \quad (7)$$

wherein n is an odd number.

As described hereinbefore, the beam light amount is different between ones of the laser beams emitted from the laser elements LD1 to LD8 positioned at respective opposite ends and ones of the same positioned in a central part. Therefore, the laser beam light amount is changed to a different value at intervals of a half period of repetition of all scanning lines formed in a single scan. In the case of images formed repeatedly at one scan period, exposure is constantly performed with the same light amount. Therefore, no density variation occurs. On the other hand, in the case of images repeated at intervals of odd number times of a half scan period, exposure is performed while alternately increasing and reducing the light amount of laser beams for forming respective dots, in the sub scanning direction.

In the equation (7), a spatial frequency A is calculated by multiplying a half period of repetition of all scanning lines formed by a single scan by an odd number. Insofar as image data (image pattern) having the special frequency A expressed by the equation (7) is concerned, since a dot formed by a laser beam having a large light amount and a dot formed by a laser beam having a small light amount are formed alternately, density variation inevitably occurs.

Figure 20:
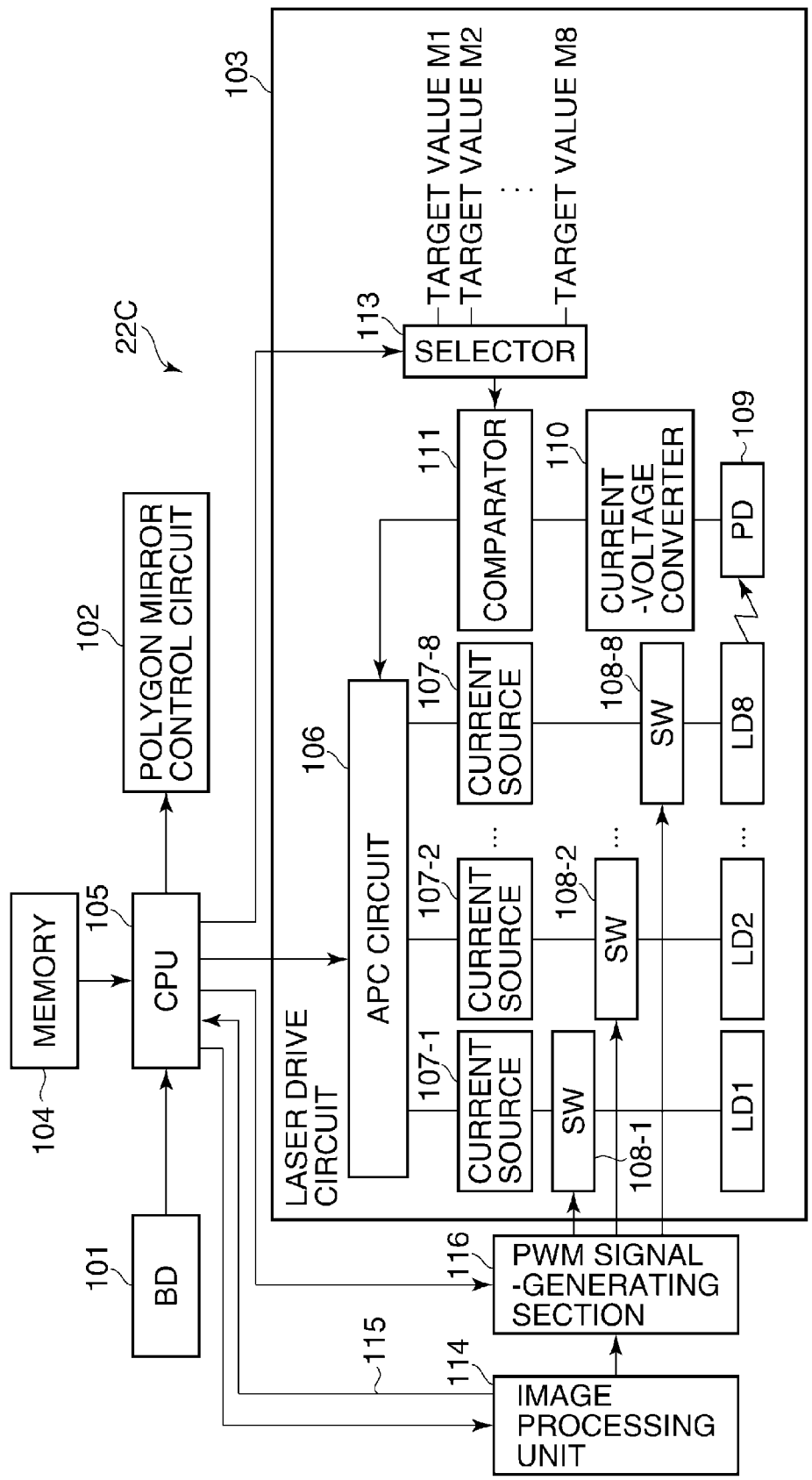
FIG. 20 is a block diagram of a controller used in an exposure control section of an image forming apparatus according to a third embodiment of the present invention.

FIG. 20 is a block diagram of a controller used in the exposure control section 22 of the image forming apparatus according to the third embodiment.

The controller shown in FIG. 20 is different in configuration from the controller 22B, shown in FIG. 13, of the exposure control section 22 of the image forming apparatus according to the second embodiment. Therefore, the controller shown in FIG. 20 is denoted by reference numeral 22C. Further, component elements of the controller 22C corresponding to those of the controller 22B in FIG. 13 are denoted by identical reference numerals, and description thereof is omitted.

In the controller 22C, the CPU 105 and the image processing unit 114 are connected to each other. The image processing unit 114 outputs a light amount correction signal (ON/OFF signal) for causing light amount correction to be executed according to an image pattern in the sub scanning direction. The light amount correction signal is delivered to the CPU 105. When the light amount correction signal is on, the CPU 105 sets the light amounts of the respective laser beams, i.e. the respective laser elements LD1 to LD8 according to image magnification. On the other hand, when the light amount correction signal is off, the CPU 105 controls a drive current to be applied to each of the laser elements LD1 to LD8, such that all the laser beams are made uniform in light amount. The image processing unit 114 (image separation unit) appearing in FIG. 20 has a memory (not shown) for storing image data on a page-by-page basis. The image processing unit 114 performs FFT (fast Fourier transformation) processing in the sub scanning direction e.g. on image data stored in the memory, to thereby determine frequency components in the sub scanning direction.

Figure 21A:
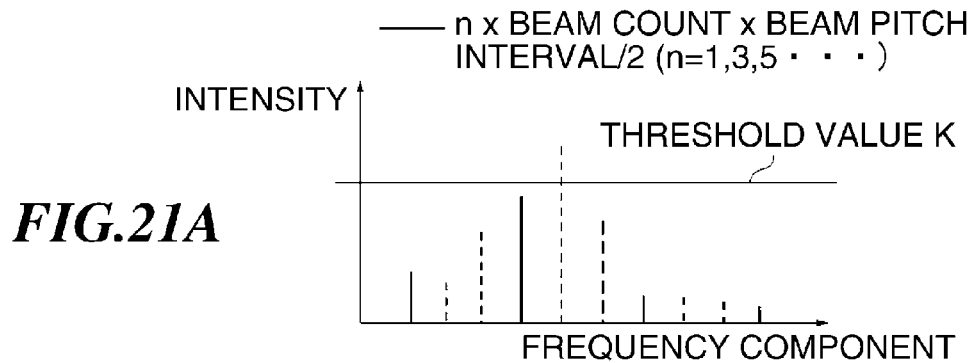
Figure 21B:
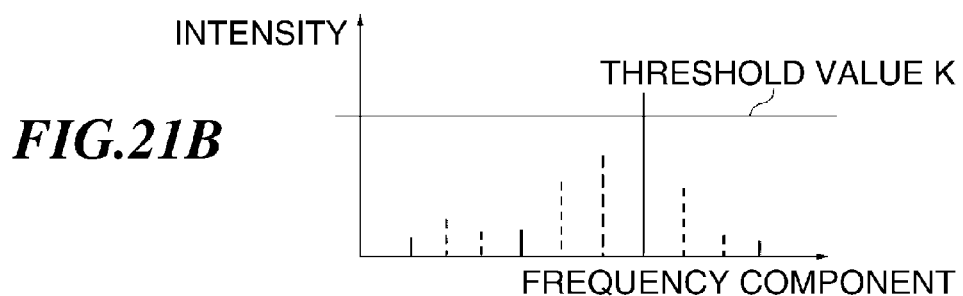
Figure 21C:
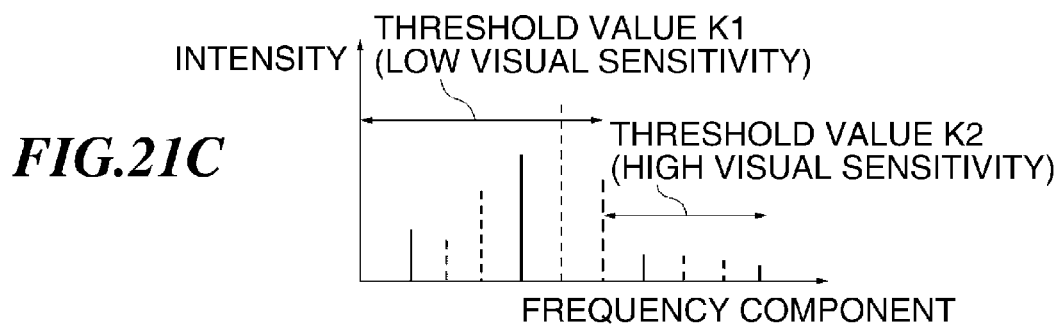

FIGS. 21A to 21C are diagrams illustrating examples of results obtained by the FFT processing executed by the image processing unit 114 appearing in FIG. 20. FIG. 21A shows an example of a result obtained by the FFT processing when the spatial frequency A is not higher than a predetermined threshold value, and FIG. 21B shows an example of a result obtained by the FFT processing when the spatial frequency A is higher than the predetermined threshold value. FIG. 21C shows a result obtained by setting a plurality of threshold values.

When the intensity (peak intensity) of the spatial frequency A as one of frequency components obtained by the FFT processing is not higher than the predetermined threshold value K as shown in FIG. 21A, the image processing unit 114 outputs a light amount correction signal indicative of ON. In this case, the CPU 105 turns on light amount correction. On the other hand, when the intensity (peak intensity) of the spatial frequency A as one of frequency components obtained by the FFT processing is higher than the predetermined threshold value K as shown in FIG. 21B, the image processing unit 114 outputs a light amount correction signal indicative of OFF. In this case, the CPU 105 turns off light amount correction.

As described above, the CPU 105 determines whether or not to perform light amount correction on image data (specific image data) stored in the memory, based on whether or not the peak intensity of the spatial frequency A is higher than the predetermined threshold value K. In the case of processing a specific image pattern that causes an image defect, the CPU 105 turns off light amount correction control to thereby prevent occurrence of the image defect due to light amount correction. Note that the threshold value K may be individually set to each of spatial frequencies (frequency components) obtained by the above-described equation (7). For example, as shown in FIG. 21C, a low threshold value K2 is set for frequency components, which are highly sensitive to human eyes, of the spatial frequencies, and a threshold value K1 which is higher than the threshold value K2 is set for frequency components which are less sensitive to human eyes. Frequency components with high sensitivity to human eyes make so-called light amount variation conspicuous. Therefore, by setting the low threshold value, it is possible to easily extract an image pattern that particularly makes an image defect conspicuous, to thereby reliably prevent occurrence of an image defect caused by light amount correction.

As described above, according to the image forming apparatus of the embodiments of the present invention, in the case of performing double-sided printing, not only the light amounts of the laser beams positioned at the opposite ends, but also those of the non-end laser beams are controlled according to magnification change. By doing this, density is made uniform on both the front and reverse sides of a recording sheet, whereby difference in image density between the front side and the reverse side is corrected.

Further, in the image forming apparatus of the embodiments of the present invention, for double-sided printing, the light amounts of the laser beams are set such that the total light amount of all the laser beams is made uniform on the front and reverse sides of a recording sheet. This makes the image density uniform on the front and reverse sides of the recording sheet. Furthermore, light amount control is turned off for an image pattern (specific image pattern) for which laser beams positioned at the opposite ends and non-end laser beams are alternately lighted periodically. By doing this, the laser beams positioned at the opposite ends and the non-end laser beams are controlled such that the light amounts thereof are made uniform, whereby occurrence of density variation due to light amount control is prevented.

In addition, in the image forming apparatus of the embodiments of the present invention, a threshold value is individually set for an image pattern (specific image pattern) for which laser beams positioned at the opposite ends and non-end laser beams are alternately lighted periodically. For example, a higher threshold value is set for an image pattern having frequency components which make density variation visually conspicuous, whereby light amount control is turned off for such an image pattern having frequency components which make density variation visually conspicuous, to thereby prevent occurrence of density variation.

Note that, as is apparent from the above description, the polygon mirror control circuit 102 functions as a rotational speed control unit, and the CPU 105 and the laser drive circuit 103 function as a light amount control unit. Further, although in the above-described embodiments, the light amounts of laser beams that form scanning lines positioned at the opposite ends in the direction of rotation of a photosensitive drum (i.e. the sub scanning direction) are corrected, only the light amount of a laser beam that forms a scanning line positioned at one end in the sub scanning direction may be corrected. This also makes it possible to correct light amount variation.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2010-127785 filed Jun. 3, 2010, and Japanese Patent Application No. 2011-119162 filed May 27, 2011, which are hereby incorporated by reference herein in their entirety.

What is claimed is:

1. An image forming apparatus that develops an electrostatic latent image formed on a photosensitive member being rotating, using toner, to thereby form a toner image, comprising:
a light source configured to emit a light beam for forming the electrostatic latent image on the photosensitive member;
a rotary polygon mirror configured to deflect the light beam such that the light beam moves on the photosensitive member in a predetermined direction; and
a light source control unit configured to control the light source,
wherein the light source comprises a plurality of light emitting points for emitting light beams, the light emitting points being arranged such that the light beams emitted from the light emitting points and deflected by the rotary polygon mirror are irradiated onto respective different positions on the photosensitive member in a direction of rotation of the photosensitive member, and
wherein the light source control unit controls the light source such that a light amount of either or both of outermost beams of the light beams, at respective opposite ends in the direction of rotation of the photosensitive member, in a case where the rotary polygon mirror is rotating at a first speed, becomes smaller than the light amount of either or both of the outermost beams of the light beams, in a case where the rotary polygon mirror is rotating at a second speed that is lower than the first speed.

2. The image forming apparatus according to claim 1, further comprising a speed control unit configured to control a rotational speed of the rotary polygon mirror to the first speed for forming the toner image at a first magnification, and control the rotational speed of the rotary polygon mirror to the second speed for forming the toner image at a second magnification that is larger than the first magnification.

3. The image forming apparatus according to claim 2, further comprising a transfer unit configured to transfer the toner image from the photosensitive member onto a recording medium, a fixing unit configured to heat and fix the transferred toner image onto the recording medium, and a conveying unit configured to invert the recording medium having passed through the fixing unit, from a first side thereof having the toner image fixed thereon by the fixing unit to a second side as a reverse side of the first side, and convey the recording medium again to the transfer unit so as to form a toner image on the second side, and wherein when the toner image is to be formed on the first side, the speed control unit controls the rotational speed of the rotary polygon mirror to the second speed, and when the toner image is to be formed on the second side, the speed control unit controls the rotational speed of the rotary polygon mirror to the first speed.

4. The image forming apparatus according to claim 2, wherein the light source control unit controls the light amount of the either or both of the outermost beams for forming the toner image at the first magnification and the light amount of the either or both of the outermost beams for forming the toner image at the second magnification based on a difference between the first magnification and the second magnification.

* * * * *